(12) United States Patent
Wu et al.

(10) Patent No.: US 11,459,808 B2
(45) Date of Patent: Oct. 4, 2022

(54) FLEXIBLE DEVICE

(71) Applicant: SHENZHEN ROYOLE TECHNOLOGIES CO. LTD., Guangdong (CN)

(72) Inventors: Weifeng Wu, Guangdong (CN); Songling Yang, Guangdong (CN)

(73) Assignee: SHENZHEN ROYOLE TECHNOLOGIES CO., LTD., Shenzhen (CN)

( * ) Notice: Subject to any disclaimer, the term of this patent is extended or adjusted under 35 U.S.C. 154(b) by 927 days.

(21) Appl. No.: 16/319,676

(22) PCT Filed: Jan. 20, 2017

(86) PCT No.: PCT/CN2017/071876
§ 371 (c)(1),
(2) Date: Jan. 22, 2019

(87) PCT Pub. No.: WO2018/014532
PCT Pub. Date: Jan. 25, 2018

(65) Prior Publication Data
US 2021/0093054 A1 Apr. 1, 2021

(30) Foreign Application Priority Data

Jul. 19, 2016 (WO) ............... PCT/CN2016/090477
Jul. 19, 2016 (WO) ............... PCT/CN2016/090478
Jul. 19, 2016 (WO) ............... PCT/CN2016/090479

(51) Int. Cl.
*A44C 5/00* (2006.01)
*A44C 5/10* (2006.01)
(Continued)

(52) U.S. Cl.
CPC .............. *E05D 3/18* (2013.01); *A44C 5/0015* (2013.01); *A44C 5/0053* (2013.01); *A44C 5/107* (2013.01);
(Continued)

(58) Field of Classification Search
None
See application file for complete search history.

(56) References Cited

U.S. PATENT DOCUMENTS 9,173,287 B1 * 10/2015 Kim ...................... G06F 1/1681
2014/0003006 A1 * 1/2014 Ahn ...................... G06F 1/1652
361/749

(Continued)

FOREIGN PATENT DOCUMENTS

CN 102297322 A 12/2011
CN 103533858 A 1/2014
(Continued)

OTHER PUBLICATIONS

International search report dated May 24, 2017 from corresponding application No. PCT/CN2017/071876.

*Primary Examiner* — Kristy A Haupt
(74) *Attorney, Agent, or Firm* — Hauptman Ham, LLP

(57) ABSTRACT

A flexible device includes two opposite sides and a flexible functional element. Each side includes a movable element having a top portion. The flexible functional element includes a flexible functional screen and a support plate supporting the flexible functional screen. The support plate includes a plate body and fixing sheets extending from the plate body. The plate body separably abuts against the top portions of the movable elements, and the fixing sheets fix to the movable elements.

20 Claims, 19 Drawing Sheets

(51) Int. Cl.
    *E05D 3/18*    (2006.01)
    *E05D 11/06*   (2006.01)
    *G06F 1/16*    (2006.01)
    *H04M 1/02*    (2006.01)

(52) U.S. Cl.
    CPC ............ *E05D 11/06* (2013.01); *G06F 1/1652* (2013.01); *G06F 1/1681* (2013.01); *H04M 1/0268* (2013.01)

(56) References Cited

U.S. PATENT DOCUMENTS

| | | | |
|---|---|---|---|
| 2015/0378391 A1* | 12/2015 | Huitema | G06F 1/163 361/679.03 |
| 2016/0077548 A1 | 3/2016 | Lim et al. | |
| 2016/0151669 A1* | 6/2016 | Komulainen | G01C 22/006 702/160 |

FOREIGN PATENT DOCUMENTS

| | | | |
|---|---|---|---|
| CN | 104851365 A | 8/2015 | |
| CN | 105492817 A | 4/2016 | |
| CN | 205281987 U | 6/2016 | |
| EP | 0118774 A | 9/1984 | |
| EP | 0557578 A | 9/1993 | |
| EP | 3023845 A1 | 5/2016 | |
| JP | 2005034293 A | 2/2005 | |

\* cited by examiner

FLEXIBLE DEVICE

RELATED APPLICATIONS

The present application is a National Phase of International Application Number PCT/CN2017/071876, filed Jan. 20, 2017; and claims the priority of International Application No. PCT/CN2016/090477, filed Jul. 19, 2016; and International Application No. PCT/CN2016/090478, filed Jul. 19, 2016; and International Application No. PCT/CN2016/090479, filed Jul. 19, 2016.

TECHNICAL FIELD

The present disclosure relates to flexible devices, and particularly to a flexible wearable device.

BACKGROUND

As people's attention to health gradually increases, more and more wearable smart devices are designed, such as smart watches, smart bracelets, smart running shoes, smart clothes, smart backpacks, and so on. Various sensors integrated in the smart device are used to monitor human body's data to achieve health maintenance.

Due to small size and portability of the smart bracelet, at present, the smart bracelet has become popular among the wearable smart devices. However, the existing smart bracelet generally has a fixed shape, whereby application requirements of more scenarios cannot be satisfied.

SUMMARY

The present disclosure provides a flexible device that can satisfy application requirements of different scenarios.

A flexible device includes two opposite sides and a flexible functional element. Each side includes a movable element having a top portion. The flexible functional element includes a flexible functional screen and a support plate supporting the flexible functional screen. The support plate includes a plate body and fixing sheets extending from the plate body. The plate body separably abuts against the top portions of the movable elements, and the fixing sheets fix to the movable elements.

Each fixing sheet is formed by integral bending of the plate body.

The support plate further includes connection sheets each connecting one of the fixing sheets to the plate body.

Each of two opposite sides of each connection sheet defines a recess recessed toward an inside of the plate body.

Each connection sheet is narrower than the fixing sheet.

The flexible device further includes fixing elements each passing through one fixing sheet and one movable element to fix the fixing sheet to the movable element.

Each fixing element passes through one fixing sheet from outside to inside, and is locked in one movable element.

The flexible device further includes a first connection element connecting to the movable elements.

The first connection element includes a base plate supporting the movable elements and sidewalls formed on ends of the base plate. Each fixing element further passes through one sidewall of the first connection element.

The first connection element further includes baffles formed on the base plate, and each baffle is adjacent to one sidewall. Each fixing sheet is sandwiched between one baffle and one sidewall adjacent to the one baffle.

Each fixing element sequentially passes through one sidewall, one fixing sheet, and one baffle, and is locked in one movable element.

The flexible device further includes positioning elements. Each of the two opposite sides of the flexible device further includes another movable element. Each of the movable elements defines at least one positioning slot. Each of the another movable elements defines a positioning hole, and each positioning element passes through one of the at least one positioning slot of one of the movable elements and the positioning hole of one of the another movable elements adjacent to the one of the movable elements.

Each movable element defines two positioning slots, each positioning slot locates at one of two opposite side portions of each movable element, and each fixing element passes through a portion of one movable element between the two positioning slots of the one movable element.

The flexible device further includes a connection rod having opposite ends, each of the two opposite sides of the flexible device further includes another movable element, each of the movable elements moves relative to one of the another movable elements, and the opposite ends of the connection rod insert in the another movable elements, respectively.

Each of the another movable elements has a top portion, the top portion of each of the another movable elements defines a fixing slot, and the connection rod inserts in the fixing slots of the another movable elements.

The flexible device further includes another movable elements and a connection beam, each of the another movable elements locates at one of the two opposite sides of the flexible device, and movably connects to one movable element, and the connection beam has opposite ends inserting in the movable elements, respectively.

The flexible device further includes a second connection element supporting the another movable elements. The connection beam locates above the second connection element.

The base plate of the second connection element is wider than the base plate of the first connection element.

Each of the two opposite sides of the flexible device further includes another movable element adjacent to one movable element, each of the another movable elements has a top surface, the top surface of each of the another movable elements has a top portion, each of the movable elements has a top surface, and the top portion of each movable element locates on the top surface of each movable element.

A movement of each of the movable elements relative to one adjacent another movable element deforms the flexible device to switch between a first state and a second state; in the first state, the plate body of the support plate is separated from other regions of the top surface of each another movable element adjacent to the top portion of each another movable element and other regions of the top surface of each movable element adjacent to the top portion of each movable element; in the second state, the plate body of the support plate is in contact with the other regions of the top surface of each another movable element adjacent to the top portion of each another movable element and the other regions of the top surface of each another movable element adjacent to the top portion of each another movable element.

By using the movable elements, the flexible device can be deformed to different shapes, thereby adapting the flexible device to application requirements of different scenarios.

BRIEF DESCRIPTION OF THE DRAWINGS

To illustrate technical solutions of embodiments of the present disclosure more clearly, the accompanying drawings required by the embodiments of the present disclosure will be illustrated briefly. Apparently, the accompanying drawings described below are merely some embodiments of the present disclosure. Based on the accompanying drawings, other obvious transformation methods can be obtained by a person ordinarily skilled in the art without paying creative efforts.

DETAILED DESCRIPTION

Below technical solutions of embodiments of the present disclosure will be described clearly and completely in conjunction with the accompanying drawings of the embodiments of the present disclosure.

Figure 1:
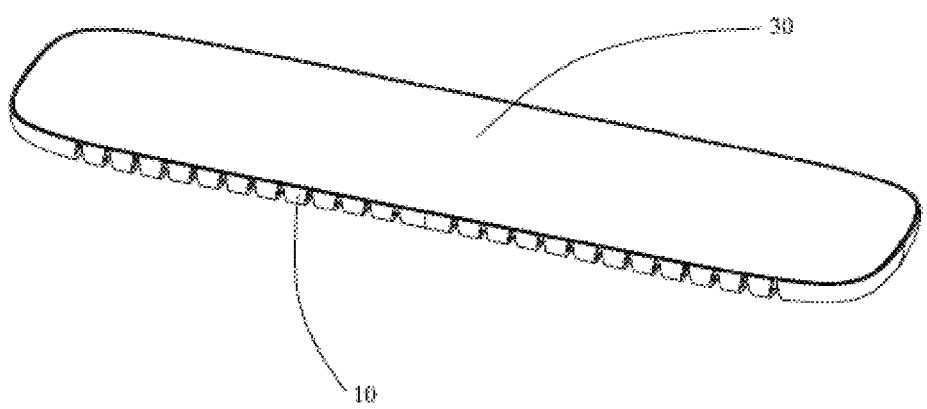
FIG. 1 is a perspective view of a flexible device according to an embodiment of the present disclosure.
Figure 2:
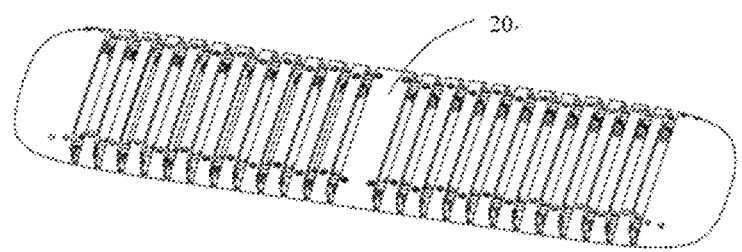
FIG. 2 is an inversion view of the flexible device of FIG. 1.
Figure 3:
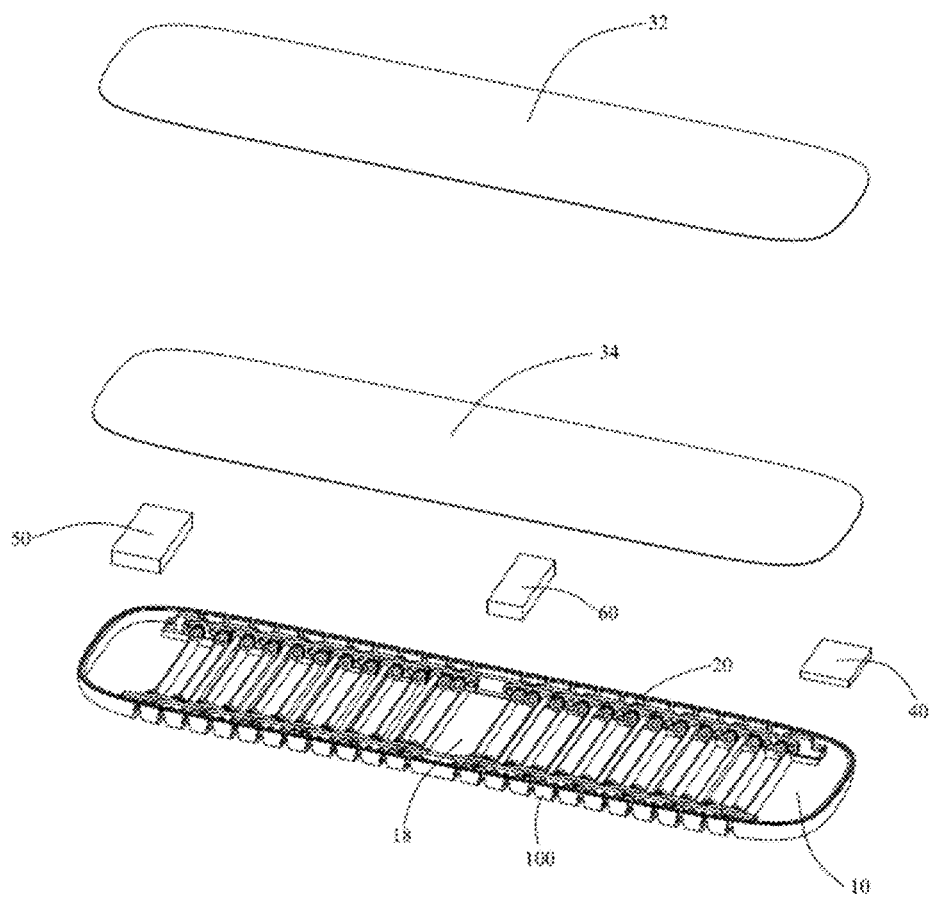
FIG. 3 is a partial exploded view of the flexible device of FIG. 1.

Referring to FIGS. 1-3, a flexible device according to an embodiment of the present disclosure is illustrated. The flexible device includes a housing 10, a flexible assembly 20 mounted in the housing 10, and a functional element 30 arranged on the housing 10. The flexible assembly 20 can be deformed to deform the flexible device, thereby adapting the flexible device to application requirements of different scenarios.

Figure 4:
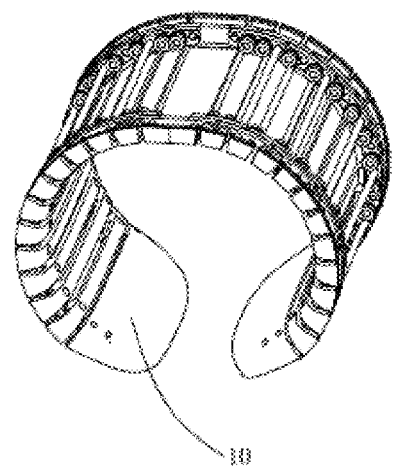
FIG. 4 is a schematic view illustrating the flexible device of FIG. 1 deformed to a bracelet, a functional element being removed.

Referring to FIG. 4, the flexible device is preferably deformed from a shape of a flat plate to a shape of a circular ring. When in the shape of the flat plate, the flexible device is fully unfolded, facilitating operations of a user. When in the shape of the circular ring, the whole flexible device is curled to form a wearable device, facilitating being worn on a body of the user. Certainly, shapes formed by the deformation of the flexible device can be changed according to requirements, thereby adapting to requirements of more application scenarios. For example, the flexible device is switched from a shape of an arch to the shape of the circular ring, from the shape of the flat plate to a shape of a wave, from a U-shape to an S-shaped, or other.

Figure 5:
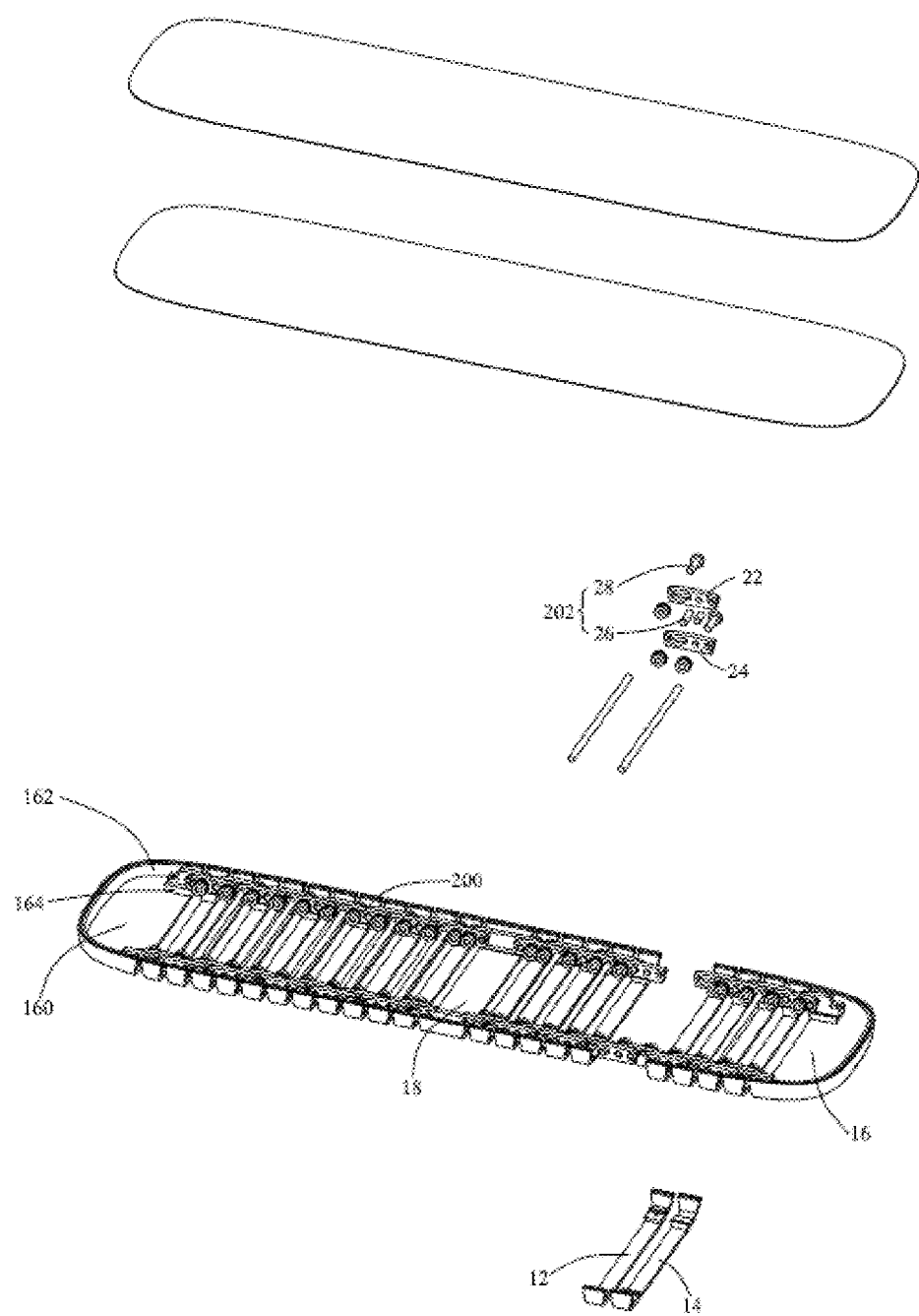
FIG. 5 is a further exploded view of the flexible device of FIG. 3.
Figure 6:
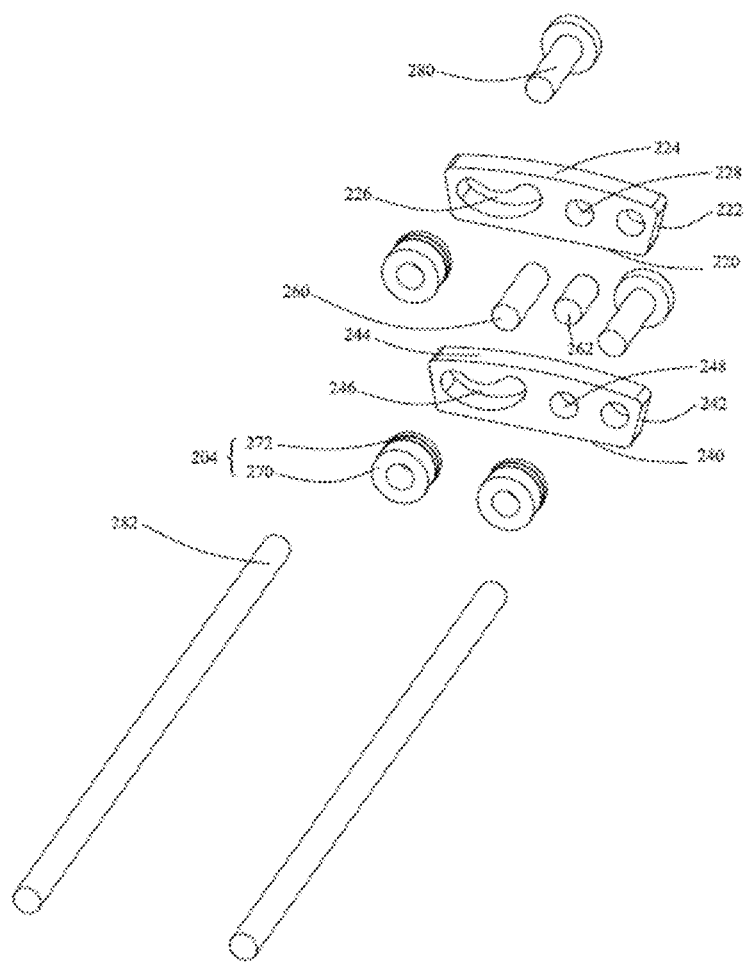
FIG. 6 is a partial enlarged view of the flexible device of FIG. 5.
Figure 7:
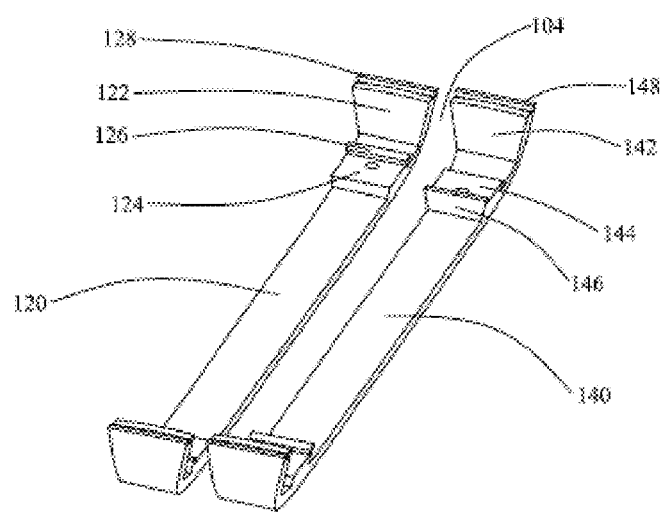
FIG. 7 is another partial enlarged view of the flexible device of FIG. 5.

Referring to FIGS. 5-7, the flexible device 20 includes movable elements 200 arranged at opposite sides of the housing 10. The movable elements 200 at each side all include a first movable element 22 and a second movable element 24 movably connected to the first movable element 22. Multiple first movable elements 22 and multiple second movable elements 24 are included, and uniformly arranged at the opposite sides of the housing 10. In other words, each side of the housing 10 includes multiple first movable elements 22 and multiple second movable elements 24, and the first movable element 22 is closer to an exterior side of the housing 10 than the second movable element 24. The first movable elements 22 at each side of the housing 10 are linearly aligned. The second movable elements 24 at each side of the housing 10 are linearly aligned. Each first movable element 22 at each side of the housing 10 is not directly connected to adjacent first movable elements 22, and each second movable element 24 at each side of the housing 10 is also not directly connected to adjacent second movable elements 24. The first movable element 22 and adjacent second movable elements 24 at the same side of the housing 10 are in staggered connection. Particularly, each first movable element 22 and two adjacent second movable elements 24 are arranged side by side and connected in a staggered manner.

The first movable elements 22 and the second movable elements 24 have the same shape and structure. In the embodiment, the first movable elements 22 and the second movable elements 24 are all hinges. The first movable element 22 is substantially trapezoid-shaped, and has a flat bottom surface 220, inclined side surfaces 222, and a curved top surface 224. The bottom surface 220 of the first movable element 22 is flat, and parallel to the undeformed functional element 30. The first movable element 22 has two side surfaces 222. Each side surface 222 is flat, and inclined relative to the bottom surface 220. Each side surface 222 and the bottom surface 220 define an obtuse angle therebetween. The obtuse angle is larger than 90 degrees and smaller than 180 degrees. Preferably, the obtuse angle is larger than 100 degrees and smaller than 110 degrees. The two side surfaces 222 extend upwards in opposite directions to connect the bottom surface 220 to the top surface 224. The top surface 224 of the first movable element 22 is an arch surface of a shape of a circular arc, and forms a support surface of the first movable element 22. The top surface 224 has a height gradually increasing from opposite ends of the top surface 224 to a middle portion of the top surface 224, thus forming a convex surface. It can be understood that the top surface 224 may be a convex surface of other shape, for example, a convex surface of a shape of a half of a hexahedron (a convex surface similar to a trapezoid), a convex surface of a shape of a half of an octahedron (a convex surface similar to a trapezoid with a rectangle at a bottom of the trapezoid), a convex surface of a shape of a half of a decahedron, or other. Connection lines each connecting one of opposite ends of an arc surface and a center of a circle where the arc surface locates define an included angle therebetween, and the included angle is defined as a span angle of the arc surface. The top surface 224 has a span angle larger than 10 degrees and smaller than 30 degrees.

The first movable element 22 defines a positioning slot 226. The positioning slot 226 extends through a front surface (i.e., an interior surface of the first movable element 22) and a rear surface (i.e., an exterior surface of the first movable element 22) of the first movable element 22, and is adjacent to one side surface 222 of the first movable element 22. The positioning slot 226 is arc-shaped, and has a bending direction opposite to that of the top surface 224. The positioning slot 226 has a height gradually decreasing from opposite ends of the positioning slot 226 to a middle portion of the positioning slot 226. The positioning slot 226 has a first arc surface, a second arc surface, and two connection arc surfaces to connect the first arc surface to the second arc surface. The first arc surface is parallel to the second arc surface, and the first arc surface and the second arc surface have a same center. The first arc surface is shorter than the second arc surface. The connection arc surfaces are substantially semi-circular, thereby forming rounded corners at the opposite ends of the positioning slot 226. The positioning slot 226 has a larger span angle than the top surface 224. Preferably, the span angle of the positioning slot 226 is larger than 70 degrees and smaller than 90 degrees.

The first movable element 22 further defines positioning holes 228. The positioning holes 228 also extend through the front surface and the rear surface of the first movable element 22. In the embodiment, the positioning holes 228 include a first positioning hole and a second positioning hole. The first positioning hole is adjacent to a middle portion of the first movable element 22, and the second positioning hole is adjacent to the other side surface 222 of the first movable element 22. The positioning hole 228 locates above a lowest point of the positioning slot 226 and below a highest point of the positioning slot 226.

Since the second movable element 24 and the first movable element 22 have the same structure and shape, for names, sizes, and position relationships and other of elements of the second movable element 24, reference can be made to the first movable element 22. The second movable element 22 is substantially trapezoid-shaped, and has a flat bottom surface 240, inclined side surfaces 242, and a curved top surface 244. The bottom surface 240 of the second movable element 24 is flat, and parallel to the undeformed functional element 30. The second movable element 24 has two side surfaces 242. Each side surface 242 is flat, and inclined relative to the bottom surface 240. Each side surface 242 and the bottom surface 240 define an obtuse angle therebetween. The obtuse angle is larger than 90 degrees and smaller than 180 degrees. Preferably, the obtuse angle is larger than 100 degrees and smaller than 110 degrees. The two side surfaces 242 extend upwards in opposite directions to connect the bottom surface 240 to the top surface 244. The top surface 244 of the second movable element 24 is an arch surface of a shape of a circular arc, and forms a support surface of the second movable element 24. The top surface 244 has a height gradually increasing from opposite ends of the top surface 244 to a middle portion of the top surface 244, thus forming a convex surface. The top surface 244 has a span angle larger than 10 degrees and smaller than 30 degrees. It can be understood that the top surface 244 may be a convex surface of other shape, for example, a convex surface of a shape of a half of a hexahedron, a convex surface of a shape of a half of an octahedron, a convex surface of a shape of a half of a decahedron, or other.

The second movable element 24 defines a positioning slot 246. The positioning slot 246 extends through a front surface (i.e., an interior surface of the second movable element 24) and a rear surface (i.e., an exterior surface of the second movable element 24) of the second movable element 24, and is adjacent to one side surface 242 of the second movable element 24. The positioning slot 246 is arc-shaped, and has a bending direction opposite to that of the top surface 244. The positioning slot 246 has a height gradually decreasing from opposite ends of the positioning slot 246 to a middle portion of the positioning slot 246. The positioning slot 246 has a first arc surface, a second arc surface, and two connection arc surfaces to connect the first arc surface to the second arc surface. The first arc surface is parallel to the second arc surface, and the first arc surface and the second arc surface have a same center. The first arc surface is shorter than the second arc surface. The connection arc surfaces are substantially semi-circular, thereby forming rounded corners at the opposite ends of the positioning slot 246. The positioning slot 246 has a larger span angle than the top surface 244. Preferably, the span angle of the positioning slot 246 is larger than 70 degrees and smaller than 90 degrees.

The second movable element 24 further defines positioning holes 248. The positioning holes 248 also extend through the front surface and the rear surface of the second movable element 24. In the embodiment, the fixing holes 248 include a first positioning hole and a second positioning hole. The first positioning hole is adjacent to a middle portion of the second movable element 24, and the second positioning hole is adjacent to the other side surface 242 of the second movable element 24. The positioning hole 248 locates above a lowest point of the positioning slot 246 and below a highest point of the positioning slot 246.

The flexible device 20 further includes positioning elements 202 connected to the movable elements 200. Particularly, the first movable elements 22 and adjacent second movable elements 24 are in staggered connection via the positioning elements 202. Part of the front surface of the first movable element 22 is in contact with part of the rear surface of the second movable element 24. The positioning element 202 can slide in the positioning slots 226 and 246, such that the first movable element 22 can move relative to the second movable element 24. In the embodiment, the positioning element 202 includes a first positioning element 26 and a second positioning element 28. The second positioning element 28 connects the first movable element 22 to one adjacent second movable element 24, and the first positioning element 26 connects the first movable element 22 to another adjacent second movable element 24. The second positioning element 28 and the first positioning element 26 may have the same structure or different structures. In the embodiment, the second positioning element 28 includes a first positioning shaft 280 and a second positioning shaft 282, and the first movable element 26 includes a first positioning shaft 260 and a second positioning shaft 262.

The first positioning shaft 280 and the second positioning shaft 282 of the second positioning element 28 first pass through the positioning slot 226 of the first movable element 22, and then pass through the two positioning holes 248 of one adjacent second movable element 24, respectively. The first positioning shaft 260 and the second positioning shaft 262 of the first positioning element 26 first pass through the two positioning holes 228 of the first movable element 22, respectively, and then pass through the positioning slot 246 of another adjacent second movable element 24. The first positioning shaft 260 and the second positioning shaft 262 of the first positioning element 26 are spaced apart from each other, and a distance between the first positioning shaft 260 and the second positioning shaft 262 of the first positioning element 26 remains unchanged during deformation of the flexible assembly 20. The first positioning shaft 280 and the second positioning shaft 282 of the second positioning element 28 are spaced apart from each other, and a distance between the first positioning shaft 280 and the second positioning shaft 282 of the second positioning element 28 remains unchanged during the deformation of the flexible assembly 20.

The first positioning shaft 280 and the second positioning shaft 282 of the second positioning element 28 may have the same structure or different structures. The first positioning shaft 260 and the second positioning shaft 262 of the first positioning element 26 may have the same structure or different structures. The first positioning shaft 280 of the second positioning element 28 and the first positioning shaft 260 of the first positioning element 26 may have the same structure or different structures, or the first positioning shaft 280 of the second positioning element 28 and the second positioning shaft 262 of the first positioning element 26 may have the same structure or different structures. The second positioning shaft 282 of the second positioning element 28 and the first positioning shaft 260 of the first positioning element 26 may have the same structure or different structures, or the second positioning shaft 282 of the second positioning element 28 and the second positioning shaft 262 of the first positioning element 26 may have the same structure or different structures. In the embodiment, the first positioning shaft 280 and the second positioning shat 282 of the second positioning element 28 and the first positioning shaft 260 and the second positioning shaft 262 of the first positioning element 26 have different structures. A length of the second positioning shaft 282 of the second fixing element 28, a length of the first positioning shaft 280 of the second fixing element 28, a length of the first positioning shaft 260 of the first fixing element 26, and a length of the second positioning shaft 262 of the first fixing element 26 sequentially decrease. The first positioning shaft 280 of the second positioning element 28 includes a screw consisted of a nut and a threaded rod extending perpendicularly from the nut. The threaded rod passes through the positioning slot 226 of the first movable element 22, and then passes through one positioning hole 248 of one adjacent second movable element 24. The nut abuts against a rear side of the first movable element 22 to prevent the first positioning shaft 280 from falling off. The second positioning shaft 282 of the second positioning element 28 includes a continuous connection rod of a shape of an elongated rod. The connection rod passes through the positioning slot 226 of the first movable element 22 and another positioning hole 248 of the adjacent second movable element 24 at one side of the flexible device, and then passes through the first positioning hole 248 of the second movable element 24 and the positioning slot 226 of one adjacent first movable element 22 at the other side of the flexible device. Thus, the connection rods connect the movable elements 200 at the opposite sides of the flexible device, and particularly connect the first movable elements 22 and the second movable elements 24 of the movable elements 200 at one side of the flexible device to the first movable elements 22 and the second movable elements 24 of the movable elements 200 at the other side of the flexible device, thereby reinforcing the flexible device. The first positioning shaft 260 of the first positioning element 26 includes a threaded rod, and the threaded rod passes through one positioning hole 228 of the first movable element 22 and the positioning slot 246 of the other adjacent second movable element 24. The second positioning shaft 262 of the first positioning element 26 includes a protruding post, and the protruding post passes through the other positioning hole 228 of the first movable element 22 and the positioning slot 246 of the other adjacent second movable element 24. The first positioning shaft 280 of the second positioning element 28 connects the first movable element 22 to one adjacent second movable element 24 at one side of the flexible device. The second positioning shaft 282 of the second positioning element 28 connects the first movable element 22 and one adjacent second movable element 24 at one side of the flexible device to the first movable element 22 and one adjacent second movable element 24 at the other side of the flexible device. The first positioning shaft 260 of the first positioning element 26 connects the first movable element 22 to the other adjacent second movable element 24 at one side of the flexible device. The second fixing shaft 262 of the first positioning element 26 connects the first movable element 22 to the other adjacent second movable element 24 at one side of the flexible device. The first positioning shafts 260 and 280 and the second positioning shafts 262 and 282 all have a diameter equal to or slightly smaller than a width of the positioning slot 226 and equal to or slightly smaller than a width of the positioning slot 246, thereby tight fitting in the positioning slots 226 and 246. A distance between the first positioning shaft 260 and the second positioning shaft 262 of the first positioning element 26 is shorter than that of the positioning slot 246, a distance between the first positioning shaft 280 and the second positioning shaft 282 of the second positioning element 28 is shorter than that of the positioning slot 226, such that the first positioning shafts 260 and 280 and the second positioning shafts 262 and 282 can slide in the positioning slots 226 and 246, thereby driving the first movable element 22 to move relative to the second movable element 24.

The flexible assembly 20 further includes limitation elements 204 abutting against the movable elements 200. The limitation element 204 is movably sleeved on the positioning element 202 to control a force applied to the movable element 200, thereby adjusting a damping value of the flexible assembly 20 during the deformation of the flexible assembly 20. Particularly, after passing through the positioning slots 226 and 246, the first positioning shafts 280 and 260 are all locked with the limitation elements 204. In the embodiment, the limitation elements 204 are all a nut 270 with an elastic tab 272, and the nuts 270 and the first positioning shafts 260 and 280 are in threaded engagement. The elastic tab 272 elastically abuts against the front surface of the first movable element 22 or the front surface of the second movable element 24, and is sandwiched between the nut 270 and the front surface of the first movable element 22 or sandwiched between the nut 270 and the front surface of the second movable element 24. Furthermore, by adjusting locking between the limitation element 204 and the first positioning shaft 260 and locking between the limitation element 204 and the second positioning shaft 280, an elastic force applied to the first movable element 22 or the second movable element 24 by the elastic tab 272 can be adjusted, thereby controlling the damping value of the flexible assembly 20 during the rotation of the flexible assembly 20. When the damping value is adjusted to be proper, the flexible assembly 20 can be positioned at any position during the rotation, thereby adapting to more shape requirements.

When the functional element 30 includes a flexible functional screen 32 such as a flexible touch screen or a flexible display screen, or a combination of the flexible touch screen and the flexible display screen, due to characteristics of a material of the flexible functional screen 32, the flexible functional screen 32 is not resistant to stretching or compression. To reduce or even prevent stretching or compression of the flexible screen 32 during the deformation of the flexible device, in the present disclosure the structure of the first movable element 22 and the second movable element 24 and the connection relationship between the first movable element 22 and the second movable element 24 are further improved.

Figure 11:
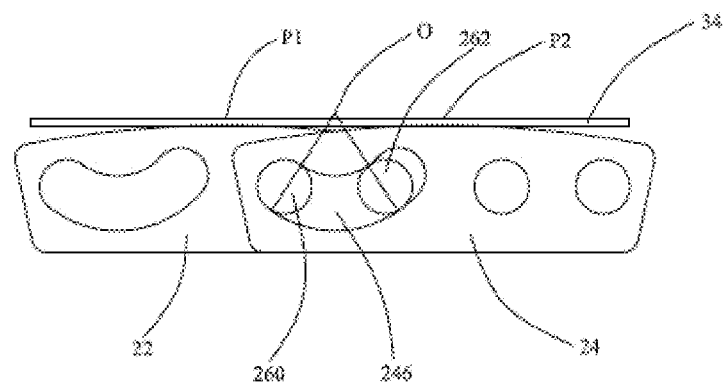
FIG. 11 is a schematic view illustrating a first movable element and a second movable element of the flexible device of FIG. 1 in a first state.
Figure 12:
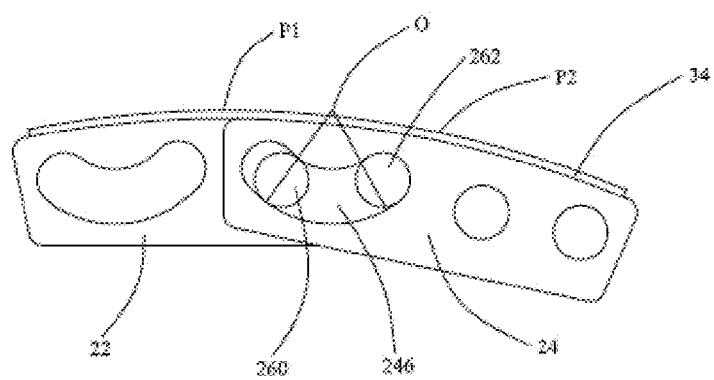
FIG. 12 is a schematic view illustrating the first movable element and the second movable element of the flexible device of FIG. 1 in a second state.

Referring to FIGS. 11-12 together, since the flexible touch screen or the flexible display screen is made from a flexible material, for easy operation or easy view, the functional element 30 further includes a support plate 34 fixed to a bottom portion of the flexible touch screen or a bottom portion of the flexible display screen. The support plate 34 and the flexible functional screen 32 have the same size and shape. The support plate 34 is made of an elastic material having high rigidity, such as steel, iron, copper, or the like. The support plate 34 has higher rigidity than the flexible functional screen 32. The support plate 34 is fixed to the first movable elements 22 and the second movable elements 24. Preferably, the support plate 34 is fixed to the support surfaces (i.e., the top surfaces 224) of the first movable elements 22 and the support surfaces (i.e., the top surfaces 244) of the second movable elements 24. Since the support surface is a convex and arc surface, the support plate 34 is fixed to a top portion of the support surface, that is, a fixing point of the support surface is the top portion of the support surface. Certainly, if the top surface 224 of the first movable element 22 and the top surface 244 of the second movable element 24 are in other shape, the fixing points may be other positions of the top surfaces 224 of the first movable elements 22 and other positions of the top surfaces 244 of the second movable elements 24, and are not limited to the top portions. Furthermore, the fixing points are defined merely for easy illustration, and essentially refer to the top portions of the top surfaces 224 and 244, and the fixing point may include a region and is not limited to a single point. The support plate 34 is fixed to the top portion of the top surface 224 of each first movable element 22 and the top portion of the top surface 244 of each second movable element 24 at each side of the flexible device. The support plate 34 is spaced apart from the other positions of the top surfaces 224 of the first movable elements 22 and the other positions of the top surfaces 244 of the second movable elements 24. The support plate 34 is fixed to the first movable elements 22 and the second movable elements 24 via welding, bonding, or other.

Since the positioning slot 246 of the second movable element 24 is in a shape of a circular arc, when the second movable element 24 moves relative to the first movable element 22, the positioning slot 246 of the second movable element 24 is limited by the first positioning shaft 260 and the second positioning shaft 262 of the first positioning element 26 that connects the first movable element 22 to the second movable element 24, such that the second movable element 24 moves along the positioning slot 246. Specifically, the second movable element 24 further moves in parallel relative to the first movable element 22 while rotating relative to the first movement element 22, i.e., the movement of the second movable element 24 relative to the first movable element 22 includes both rotational movement and parallel movement. The second movable element 24 rotates clockwise relative to the first movable element 22. The second movable element 24 moves in parallel toward the positioning slot 226 of the first movable element 22.

Figure 13:
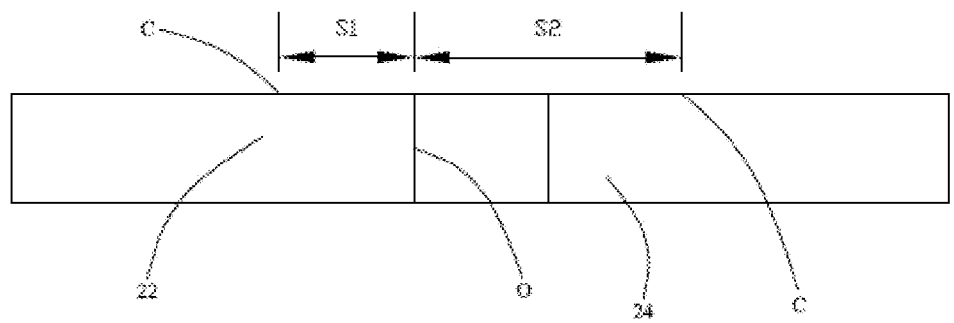
FIGS. 13-15 are schematic views illustrating a principle of switching states of the first movable element and the second movable element of FIGS. 11-12.
Figure 14:
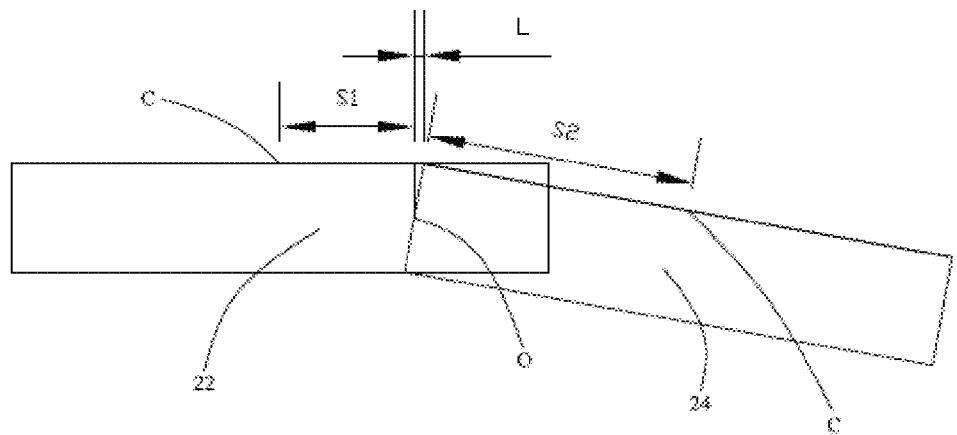
Figure 15:
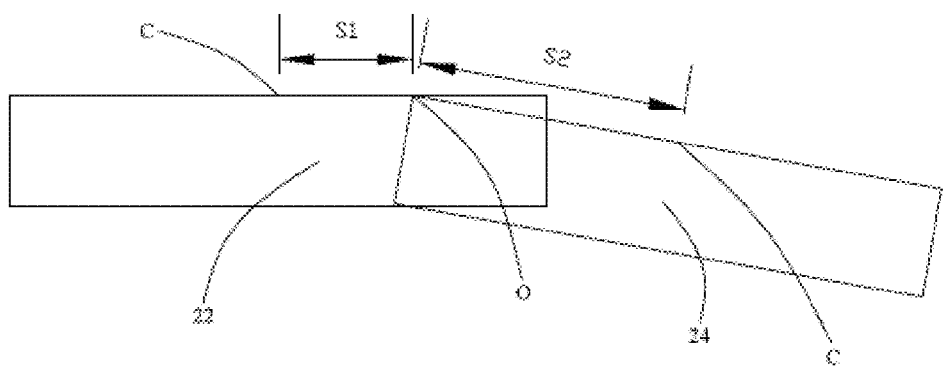

Furthermore, since the positioning slot 246 of the second movable element 24 is in the shape of the circular arc, the positioning slot 246 has a corresponding center. The center is also a rotation center O of the second movable element 24. The rotation center referred to in the embodiment means that during a rotation of a certain element around the rotation center, a distance between any position of the element and the rotation center keeps unchanged. A track of the movement of the second movable element 24 around the rotation center O is curved in a direction opposite to that in which the top surface 244 of the second movable element 24 is curved. In the embodiment, the rotation center O of the second movable element 24 is located above a thickness center of the second movable element 24. Particularly, the rotation center O of the second moveable element 24 is flush with the top portion of the support surface of the second movable element 24 or located above the second movable element 24. Since the rotation center O of the second movable element 24 is located above the thickness center of the second movable element 24, the rotation of the second movable element 24 around the rotation center O can reduce a length difference which is generated for thickness of the second movable element 24. As illustrated in FIGS. 13-15, for simplification, the first movable element 22 and the second movable element 24 are both set to be rectangular bodies, centers C of top surfaces of the rectangular bodies are the fixing points of the first movable element 22 and the second movable element 24. A distance between the center C of the top surface of the first movable element 22 and a distal end of the second movable element 24 adjacent to the first movable element 22 is S1, and a distance between the distal end of the second movable element 24 adjacent to the first movable element 22 and the center C of the top surface of the second movable element 24 is S2. Assuming that the rotation center O of the second movable element 24 and the thickness center of the second movable element 24 have the same height, as illustrated in FIG. 13, when the second movable element 24 does not rotate, a distance between the center C of the top surface of the first movable element 22 and the center C of the top surface of the second movable element 24 is S1+S2. As illustrated in FIG. 14, since the rotation center O is located below the top surface of the second movable element 24, after the rotation of the second movable element 24 around the rotation center O, comparing with the position before rotation, the distal end of the top surface of the second movable element 24 adjacent to the first movable element 22 is moved a distance L along the top surface of the first movable element 22. Under this condition, along the top surface of the first movable element 22 and the top surface of the second movable element 24, a length between the center C of the top surface of the first movable element 22 and the center C of the top surface of the second movable element 24 is S1+S2+L. Obviously, due to L, the distance between the centers C along the top surface of the first movable element 22 and the top surface of the second movable element 24 has a length difference. As illustrated in FIG. 15, assuming that the rotation center O of the second movable element 24 is flush with the top surface of the second movable element 24, during the rotation of the second movable element 24 around the rotation center O, since the rotation center O of the second movable element 24 is flush with the top surface of the second movable element 24, the distance between the center C of the top surface of the first movable element 22 and the center C of the top surface of the second movable element 24 along the top surface of the first movable element 22 and the top surface of the second movable element 24 is always S1+S2, thereby avoiding to generate the length difference. It can be seen that along a thickness direction of the second movable element 24, from the thickness center of the second movable element 24 to the top surface of the second movable element 24, the higher the rotation center O of the second movable element 24 is, the smaller the length difference is.

On the contrary, the larger the length difference is, and the large length difference indicates that the distance between the center C of the top surface of the first movable element 22 and the center C of the top surface of the second movable element 24 along the top surfaces of the first movable element 22 and the second movable element 24 is long. Since the support plate 34 is fixed to both the fixing point (i.e., the center C of the top surface) of the first movable element 22 and the fixing point (i.e., the center C of the top surface) of the second movable element 24, when the distance between the fixing point of the first movable element 22 and the fixing point of the second movable element 24 along the top surface of the first movable element 22 and the top surface of the second movable element 24 becomes long, which indicates that the length of the support plate 34 between the two fixing points needs to become long, thereby stretching and deforming the support plate 34 between the two fixing points.

Based on the above principle, in order to reduce or prevent the stretching of the support plate 34 between the two fixing points, in the embodiment, the rotation center O of the second movable element 24 is set to be located above the thickness center of the second movable element 24, and particularly, set to be flush with the fixing point of the second movable element 24. Certainly, the rotation center O may be located on the support plate 34, and particularly, located on the top surface of the support plate 34.

Furthermore, in the embodiment, the top surface 224 of the first movable element 22 and the top surface 244 of the second movable element 24 are arc-shaped. After rotation of the second movable element 24 around the first movable element 22, the top surfaces 224 of the second movable elements 24 and the top surfaces 244 of the first movable elements 22 together form a continuous arc surface (curvatures of the top surfaces 224 of the first movable elements 22 and curvatures of the top surfaces 244 of the second movable elements 24 are continuously distributed), such that the entire flexible device forms a circular ring. Furthermore, a projection of the top surface 224 of each first movable element 22 on a plane perpendicular to the top surface 224 and a projection of the top surface 244 of each second movable element 24 on a plane perpendicular to the top surface 244 together form a continuous arc surface (a curvature of the projection of the top surface 224 of each first movable element 22 on the plane perpendicular to the top surface 224 and a curvature of the projection of the top surface 244 of each second movable element 24 on the plane perpendicular to the top surface 244 are continuously distributed). Therefore, part of the support plate 34 between the fixing point of the first movable element 22 and the fixing point of the second movable element 24 needs to be bent to a shape of an arc in consistence with the top surface 224 of the first movable element 22 and the top surface 244 of the second movable element 24, to ensure that after the movement of the second movable element 24 relative to the first movable element 22, the support plate 34 can be tightly attached to the continuous arc surface constituted by the first movable elements 22 and the second movable elements 24. As a length of an arc is longer than a linear distance, and particularly, a length of an arc defined by the fixing points of the first movable element 22 and the second movable element 24 and the rotation center O of the second movable element (the rotation center O is set to be located on the top surface 224 of the first movable element 22) is longer than a sum of a linear distance between the fixing point of the first movable element 22 and the rotation center O of the second movable element 24 and a linear distance between the fixing point of the second movable element 24 and the rotation center O of the second movable element 24. If not adjusted, a length difference between the length of the arc and the linear length may also cause the support plate 34 to be stretched. Therefore, in fact, the rotation center O of the second movable element 24 needs to be further adjusted to reduce or offset the length difference between the length of the arc and the linear length. Referring to FIGS. 11-12, preferably, the rotation center O of the second movable element 24 needs to be located above the top surface of the support plate 34, such that the second movable element 24 can further move in parallel toward the first movable element 22 during the rotation of the second movable element 24 around the rotation center O, thereby reducing or offsetting the length difference between the length of the arc and the linear length. A ratio of a distance between the rotation center O of the second movable element 24 and the top surface of the support plate 34 to thickness of the support plate 34 ranges from 0.1 to 0.5. Since the rotation center O is located above the top surface of the support plate 34, the position of the rotation center O is constant relative to the first movable element 22, in other words, when the second movable element 24 moves relative to the first movable element 22, the position of the rotation center O relative to the first movable element 22 is unchanged. Certainly, assuming that the rotation center O is located on the top surface of the support plate 34 or on the top surface 224 of the first movable element 22, the position of the rotation center O relative to the first movable element 22 is also constant. Furthermore, the rotation center O may be located on the flexible functional screen 32 or even located above the flexible functional screen 32. In addition, since the rotation center O of the second movable element 24 is located above the top surface of the support plate 34, the rotation center O is located above a lower portion (i.e., the support plate 34) of the functional element 30 having higher hardness, and is located below or flush with an upper portion (i.e., the flexible functional screen 32) of the functional element 30 having low hardness.

When the flexible device is in a first sate (e.g., the shape of the flat plate), the second movable element 24 is unfolded relative to the first movable element 22. The second movable element 24 and the first movable element 22 are arranged side by side and flush with each other. The first positioning shaft 260 of the first positioning element 26 abuts against a first distal end of the positioning slot 246 of the second movable element 24. The second positioning shaft 262 of the first positioning element 26 is spaced apart from a second distal end of the positioning slot 246 of the second movable element 24. The first distal end and the second distal end are arranged at opposite ends of the positioning slot 246. When the flexible device is in a second state (e.g., the shape of the circular ring), the second movable element 24 is folded relative to the first movable element 22. The second movable element 24 and the first movable element 22 are arranged side by side to define an included angle therebetween, and the second movable element 24 is inclined relative to the first movable element 22. The first positioning shaft 260 of the first positioning element 26 is spaced apart from the first distal end of the positioning slot 246 of the second movable element 24, and the second positioning shaft 262 of the first positioning element 26 abuts against the second distal end of the positioning slot 246 of the second movable element 24. Similarly, in different states, the second positioning element 28 has position relationships similar to that of the first positioning element 26, which will not be repeated herein.

Since the support plate 34 is merely fixed to the top portion of the top surface 224 of the first movable element 22 and the top portion of the top surface 244 of the second movable element 24; in the first state, the bottom surface of the support plate 34 is spaced apart from the other positions of the top surface 224 of the first movable element 22 and the other positions of the top surface 244 of the second movable element 24; in the second state, the bottom surface of the support plate 34 is in contact with the other positions of the top surface 224 of the first movable element 22 and the other positions of the top surface 244 of the second movable element 24. An area of a portion of the support plate 34 in contact with the top surface 224 of the first movable element 22 or the top surface 244 of the second movable element 24 in the second state is larger than that of a portion of the support plate 34 in contact with the top surface 224 of the first movable element 22 or the top surface 244 of the second movable element 24 in the first state.

Particularly, a position of the top surface of the support plate 34 corresponding to the fixing point of the first movable element 22 is defined as a first reference point P1, and a position of the top surface of the support plate 34 corresponding to the fixing point of the second movable element 24 is defined as a second reference point P2. An arc length of the top surface of the support plate 34 between the first reference point P1 and the second reference point P2 in the second state is equal to a linear distance between the first reference point P1 and the second reference point P2 in the first sate. Therefore, it can be ensured that the length of the top surface of the support plate 34 stays unchanged during the deformation of the flexible device.

It can be understood that the first positioning element 26 may merely include the first positioning shaft 260, and the first positioning element 26 is the first positioning shaft 260, correspondingly, the positioning slot 246 of the second movable element 24 is correspondingly shortened; the second positioning element 28 may merely include the first positioning shaft 280, and the second positioning element 28 is the first positioning shaft 280, correspondingly, the positioning slot 226 of the first movable element 22 is correspondingly shortened. An effect realized by using both the first positioning shafts 260 and 280 and the second positioning shafts 262 and 282 can also be realized by merely using the first positioning shafts 260 and 280. It is to be understood that under some conditions, the positioning element 202 may merely include the second positioning element 28, and the positioning element 202 is the second positioning element 28. Correspondingly, the first movable element 22 and the second movable element 24 are in overlap arrangement, for example, one first movable element 22 is arranged on the exterior side of one second movable element 24, another second movable element 24 is arranged the exterior side of the first movable element 22, and another first movable element 22 is further arranged on the exterior side of the another second movable element 24, and so on. Each positioning element 202 correspondingly passes through an overlapping position of the first movable element 22 and the second movable element 24. Such condition can also realize shape switching of the flexible device and ensure that the flexible functional screen 32 is not stretched or is slightly stretched. It can be further understood that, under an extreme condition, each side of the flexible assembly 20 may include only one first movable element 22 and only one second movable element 24, or only one side of the flexible assembly includes only one first movable element 22 or only one second movable element 24, and the flexible assembly 20 may be further arranged in the middle portion of the housing 10, such that when the flexible assembly 20 includes only one first movable element 22 and only one second movable element 24, the shape switching of the flexible device can be still realized, and it can be still ensured that the functional element 30 is not stretched or slightly stretched.

Referring to FIG. 7, the housing 10 includes multiple connection elements 100. The connection elements 100 include multiple first connection elements 12 and multiple second connection elements 14. The first connection elements 12 and the second connection elements 14 are alternatively arranged and spaced apart from each other. The first connection elements 12 and the second connection elements 14 may be made of a hard material such as plastic, metal, or the like, so as to protect electronic components in the housing 10. The first connection element 12 and the second connection element 14 may have the same structure or different structures. In the embodiment, the first connection element 12 and the second connection element 14 have different structures. The first connection element 12 includes a base plate 120 and sidewalls 122 extending upwards from opposite ends of the base plate 120, and the second connection element 14 includes a base plate 140 and sidewalls 142 extending upwards from opposite ends of the base plate 140. The base plate 120 of the first connection element 12 further forms two protruding steps 124, and the base plate 140 of the second connection element 14 further forms two protruding steps 144. The steps 124 of the first connection element 12 are adjacent to the opposite ends of the base plate 120, respectively, and further adjacent to the sidewalls 122, respectively; the steps 144 of the second connection element 14 are adjacent to the opposite ends of the base plate 140, respectively, and further adjacent to the sidewalls 142, respectively. The step 124 of the first connection element 12 further forms a protruding baffle 126, and the step 144 of the second connection element 14 further forms a protruding baffle 146. The baffle 126 is higher than the step 124, and the baffle 146 is higher than the step 144. The baffle 146 of the second connection element 14 is located on an interior side of the step 144 and far away from the corresponding sidewall 142. The baffle 126 of the first connection element 12 is located at an exterior side of the step 124 and adjacent to the corresponding sidewall 122. The baffle 126 of the first connection element 12 is spaced apart from the adjacent sidewall 122, and the baffle 146 of the second connection element 14 is spaced apart from the adjacent sidewall 142. When the flexible device is in the first state, the second state, or other state between the first state and the second state, the first connection element 12 is always spaced apart from the second connection element 14 to define a groove 104 therebetween. During the deformation of the flexible assembly 20, the first connection element 12 and the second connection element 14 moves relative to each other but are always spaced apart from each other.

The step 124 of the first connection element 12 defines a screw hole, and the step 144 of the second connection element 14 defines a screw hole. Each first connection element 12 and one adjacent second connection element 14 constitutes a connection element group to connect and support a movable element group constituted by one first movable element 22 and one adjacent second movable element 24. The first connection element 12 and the second connection element 14 are arranged side by side. The first movable element 22 and the second movable element 24 are arranged on the step 124 of the first connection element 12 and the step 144 of the second connection element 14 at the same side, respectively. The first movable element 22 abuts against a top surface of the step 124 of the first connection element 12, and the second movable element 24 abuts against a top surface of the step 144 of the second connection element 14. The first movable element 22 is adjacent to the baffle 126 of the first connection element 12, and the second movable element 24 is adjacent to the baffle 146 of the second connection element 14, thus the first movable element 22 and the second movable element 24 are in staggered arrangement. The baffle 126 of the first connection element 12 abuts against the exterior side of the first movable element 22, and the baffle 146 of the second connection element 16 abuts against the interior side of the second movable element 24, such that the first movable element 12 and the second movable element 14 are sandwiched between the baffle 126 and the baffle 146 to limit the first movable element 22 and the second movable element 24. A screw is passed through a bottom surface of the first movable element 22 from the screw hole of the first connection element 12, and a screw is passed through a bottom surface of the second movable element 24 from the screw hole of the second connection element 14, thereby further locking the first movable element 22 to the first connection element 12, and locking the second movable element 24 to the second connection element 14. The multiple connection element groups are sequentially connected to constitute the housing 10 of the flexible device, and the multiple movable element groups are sequentially connected to constitute the flexible assembly 20 of the housing 10.

A top portion of each sidewall 122 of the first connection element 12 forms a flange 128 adjacent to an exterior side of the first connection element 12, and a top portion of each sidewall 142 of the second connection element 14 forms a flange 148 adjacent to an exterior side of the second connection element 14. The flange 128 is located above the top portion of the sidewall 122, and the flange 148 is located above the top portion of the sidewall 148. The top portions of the sidewalls 122 and 142 cooperate with the flanges 128 and 148 to support and limit the support plate 34. Bottom surfaces of edges of the support plate 34 abut against the top surfaces of the sidewalls 122 and 142, and side surfaces of the edges of the support plate 34 abut against interior sides of the flanges 128 and 148. Therefore, the edges at opposite sides of the support plate 34 are limited by the flanges 128 and 148.

Referring to FIG. 3 together, the support plate 34 and the housing 10 together define a hollow cavity to accommodate electronic components. The electronic components may include a controller 40 configured to control the functional element 30, a battery 50 configured to power the functional element 30 and the controller 40, a communication module configured to communicate the flexible device with external electronic devices, and so on.

In addition, the functional element 30 is not limited to the aforementioned flexible touch screen or flexible display screen, and may also include functional elements of other types according to different needs, such as a display screen/an indicator screen of other type, functional sensors, a speaker, a microphone, and so on. The display screen/indicator screen of the other type may be one of screens having different areas such as a rigid display, an electronic ink screen, an LED illuminator, or other, and can be fixed to the top surface of the support plate 34. The functional sensors may include a body temperature sensor, a temperature sensor, a speed sensor, a gravity sensor, a height sensor, an angular velocity sensor, an acceleration sensor, a barometric pressure sensor, a heart rate sensor, a pulse sensor, a sweat sensor, a light sensor, a myoelectric sensor, etc., which may be arranged in various positions of the flexible device according to different usages, such as the top surface of the support plate 34, the cavity defined by the support plate 34 and the housing 10, the bottom surface of the housing 10, and so on. The speaker and microphone may also be disposed within the cavity defined by the support plate 34 and the housing 10.

Figure 16:
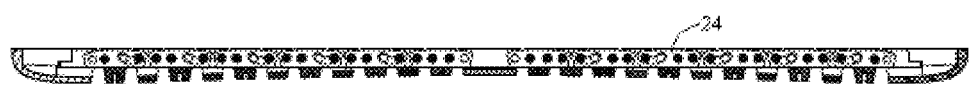
FIG. 16 is a sectional view of the flexible device of FIG. 1.
Figure 17:
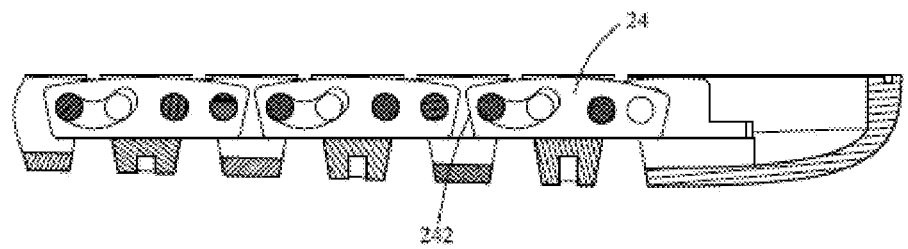
FIG. 17 is a partial enlarged view of the flexible device of FIG. 16.
Figure 18:
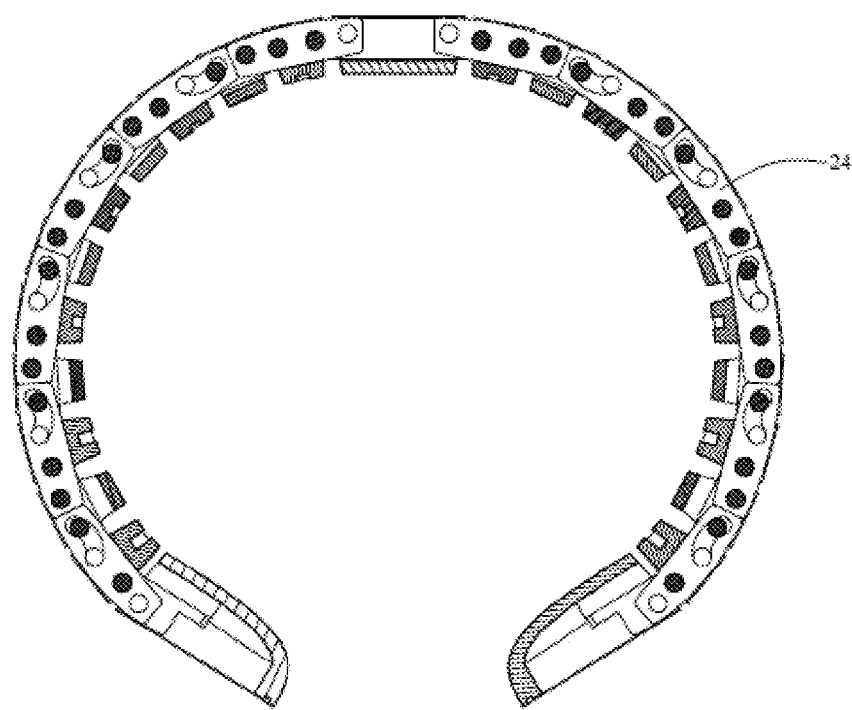
FIG. 18 is a sectional view of the flexible device of FIG. 4.

Referring to FIGS. 16-18 together, in use, if it needs to switch to the first state, the flexible device can be laid flat, at this point, the support plate 34 is in the shape of the flat plate, the first movable elements 22 at each side are linearly arranged, and the second movable elements 24 at each side are also linearly arranged. Each first movable element 22 is spaced apart from adjacent first movable elements 22. One sidewall 222 of each first movable element 22 is spaced apart from the opposite sidewall 222 of one adjacent first movable element 22 by a gap. The gap has a width gradually increasing from top to bottom to form a shape of a trapezoid. Each second movable element 24 is spaced apart from adjacent second movable elements 24. One sidewall 242 of each second movable element 24 is spaced apart from the opposite sidewall 242 of one adjacent second movable element 24 by a gap. The gap has a width gradually increasing from top to bottom to form a shape of trapezoid. The top surface of the first movable element 22 and the top surfaces of adjacent second movable elements 24 are discontinuously distributed. When it needs to switch to the second state, the flexible device is bent, at this point, the support plate 34 is in a shape of a circular arc smaller than 360 degrees. The first movable elements 22 at each side are arranged to form a circular arc, and the second movable elements 24 at each side are also arranged to form a circular arc. Each first movable element 22 abuts against adjacent first movable elements 22. One sidewall 222 of each first movable element 22 is in contact with the opposite sidewall 222 of one adjacent first movable element 22. Each second movable element 24 abuts against adjacent second movable elements 24. One sidewall 242 of each second movable element 24 is in contact with the opposite sidewall 242 of one adjacent second movable element 24. The top surface of the first movable element 22 and the top surfaces of adjacent first movable elements 22 are continuously distributed, and the top surface of the first movable element 22 and the top surfaces of adjacent second movable elements 24 are also continuously distributed. Since adjacent first movable elements 22 abut each other, and adjacent second movable elements 24 abut each other, the flexible device is limited, and a bending degree of the flexible device is limited to fall within a desired range. In particular, after being bent, the top surfaces of the first movable elements 22 at each side together form a continuous arc surface larger than 270 degrees, and the top surfaces of the second movable elements 24 at each side also together form a continuous arc surface larger than 270 degrees. Due to the continuous arc surface, the flexible touch screen or flexible display screen can be in a shape of a nearly perfect circular ring, so that the user can get a good experience during using or watching. In the second state, the flexible device can be worn on the wrist of the user and used as a smart bracelet. Certainly, in the second state, the flexible device can also be worn at any wearable position such as arm, waist, thigh, calves, neck, forehead, and so on.

Since the first movable element 22 and the second movable element 24 are both used as the flexible assembly 20, compared with a flexible material (such as soft plastic, cloth tape, etc.), not only the strength is higher, but also the lifespan is longer, and a desired bending degree can be further customized, thereby being widely used and adapting to application requirements of various scenarios. Certainly, in some scenarios having low requirements, the flexible assembly 20 may also be made from a flexible material.

In addition, considering that the electronic components such as the controller 40, the battery 50, and the communication module are not resistant to bending, in order to protect the electronic components, the housing 10 further includes two end caps 16 disposed at opposite ends of the housing 10, respectively. The two end caps 16 have the same structure and are arranged symmetrically. The end cap 16, the first connection element 12, and the second connection element 14 may be made of the same rigid material. Each end cap 16 includes a base plate 160 and a sidewall 162 extending upwards from an edge of the base plate 160. The base plate 160 is substantially semi-circular, and an area of the base plate 160 is larger than that of the base plate 120 of the first connection element 12 or that of the base plate 140 of the second connection element 14, and larger than a sum of the area of the base plate 120 of the first connection element 12 and the area of the base plate 140 of the second connection element 14. The base plate 160 forms two steps 164 at opposite positions adjacent to an edge of the base plate 160, respectively. Each step 164 defines two screw holes on a top surface thereof. The sidewall 162 forms a flange on a top surface thereof adjacent to an exterior side thereof. The support plate 34 also abuts against the top surface of the sidewall 162 and an interior side of the flange. Since the area of the base plate 160 of the end cap 16 is large, a large receiving space can be provided to accommodate the electronic components that are not resistant to bending. For example, the battery 50 can be accommodated in one of the end caps 16, and the electronic components such as the controller 40, the communication module, and a circuit board can be accommodated in the other end cap 16. The battery 50 is coupled with the controller 40, the communication module, and the circuit board by wires. The flexible touch screen or flexible display screen is coupled with the circuit board through a flexible circuit board to achieve electrical connection with the controller 40, the communication module, and the battery 50. Since the battery 50 and the controller 40 are located within the two end caps 16, respectively, the battery 50 and the controller 40 are also located at opposite ends of the flexible assembly 20, respectively. The battery 50 and the controller 40 also move following the deformation of the flexible assembly 20 to change a distance between the battery 50 and the controller 40. In particular, the distance between the battery 50 and the controller 40 gradually decreases as the flexible assembly 20 is deformed to the second state.

By arranging the battery 50 and the other electronic components in the two separate end caps 16, respectively, an internal space of the flexible device can be effectively saved, making the flexible device thinner and lighter. Moreover, the design that the battery 50 is separated from the other electronic components can also prevent heat generated by the battery 50 and the other electronic components from interacting with each other, thereby ensuring that the battery 50 and the other electronic components can operate normally.

Figure 10:
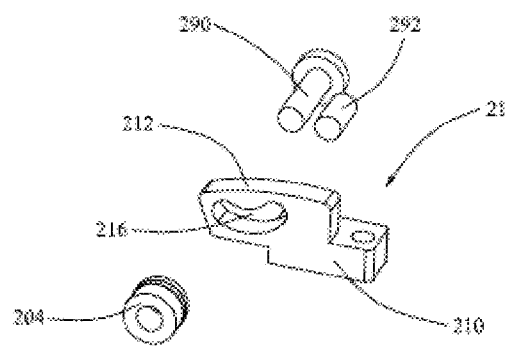
FIG. 10 is another partial enlarged view of the flexible device of FIG. 8.

Referring to FIG. 10, furthermore, the flexible assembly 20 further includes third movable elements 21 to connect the end caps 16 to adjacent first movable elements 22 or adjacent second movable elements 24. The third movable element 21 includes a base 210 and a plate body 212 formed on a top surface of the base 210. The base 210 is parallel to the top surface of the step 164 of the end cap 16, and the plate body 212 is perpendicular to the top surface of the step 164. A shape of the plate body 212 is similar to that of part of the first movable element 22 defining the positioning slot 226 or part of the second movable element 24 defining the positioning slot 246, and also defines a positioning slot 216. The positioning slot 216 of the plate body 212 has the same shape as the positioning slot 226 of the first movable element 22 or the positioning slot 246 of the second movable element 24. Similar to the first movable element 22 or the second movable element 24, the positioning element 202 passes through the positioning slot 216 of the plate body 212 and the positioning hole 228 of one adjacent first movable element 22 or the positioning hole 248 of one adjacent second movable element 24, whereby the third movable element 21 is movably connected to the adjacent first movable element 22 or the adjacent second movable element 24. The positioning element 202 includes a first positioning shaft 290 and a second positioning shaft 292, and a distal end of the first positioning shaft 290 is locked in one limitation element 204 after passing through one adjacent first movable element 22 or one adjacent second movable element 24. The structure and function of the limitation element 204 are the same as those of the aforementioned limitation element 204, respectively. The base 210 is locked to the top surface of the step 164 of the end cap 16 by a fixing element such as a screw.

Figure 8:
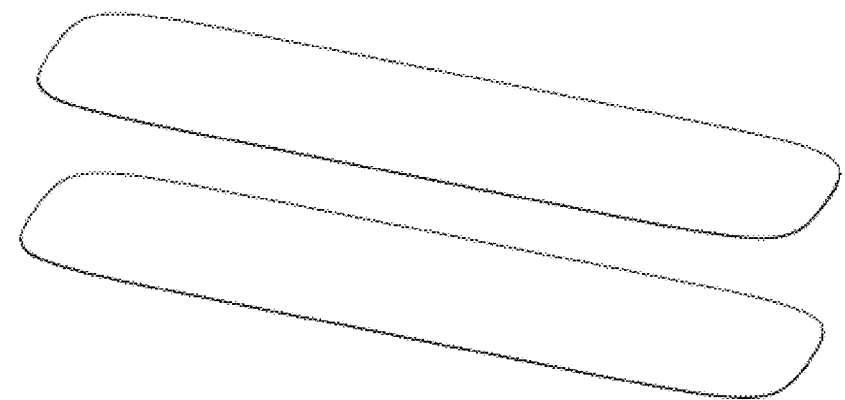
FIG. 8 is another partial exploded view of the flexible device of FIG. 1.
Figure 8:
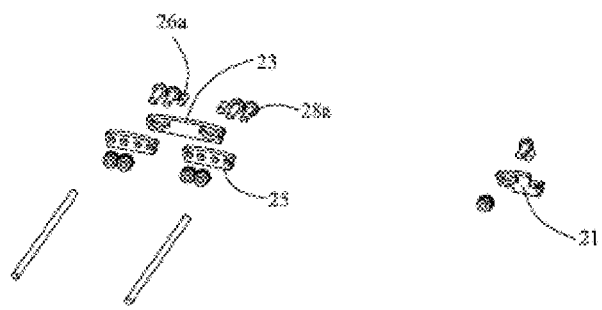
Figure 8:
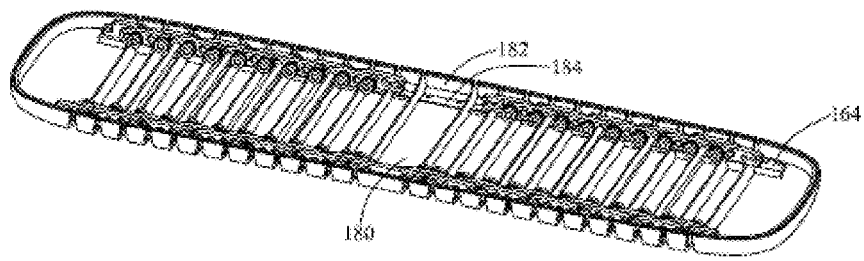
Figure 9:
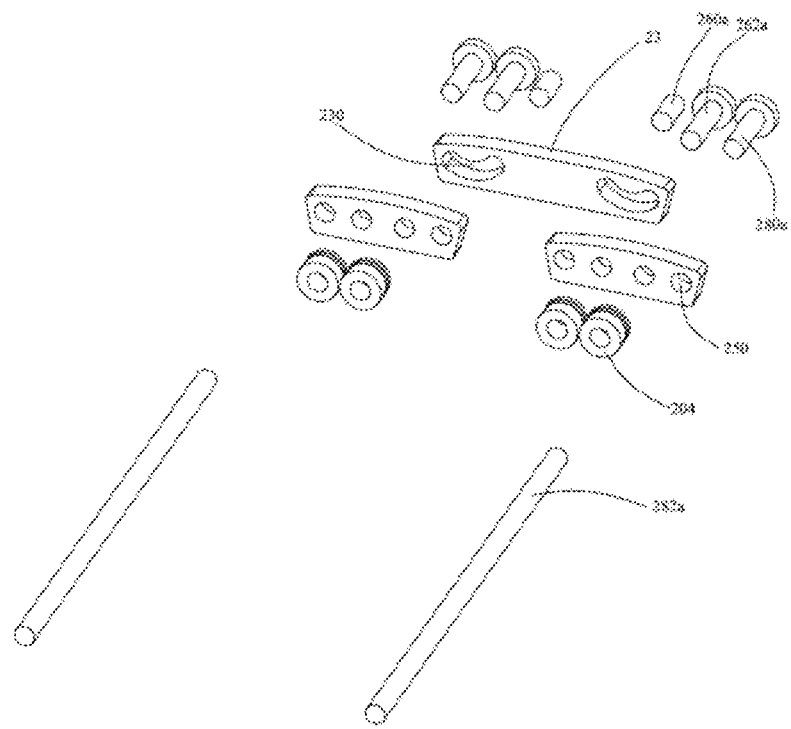
FIG. 9 is a partial enlarged view of the flexible device of FIG. 8.

Referring to FIGS. 8-9 together, since the end cap 16 has a limited space, the battery 50 accommodated in the end cap 16 has a limited capacity. In order to make the flexible device have a long service time, another battery 60 is preferably installed in the flexible device. The battery 60 has a lower capacity than the battery 50. The battery 60 can be placed at a suitable position of the flexible device as desired. In the embodiment, the battery 60 is mounted in the middle portion of the flexible device. Correspondingly, the flexible device also forms a corresponding protection structure in the middle portion to prevent the battery 60 from being bent. Specifically, the housing 10 of the flexible device has a third connection element 18 in the middle portion, and the third connection element 18 has a large area. The third connection element 18 has a configuration similar to that of the first connection element 12 or that of the second connection element 14, and a main difference is that the area of the third connection element 18 is larger than that of the first connection element 12 or that of the second connection element 14. The third connection element 18 also has a base plate 180, sidewalls 182, and a step 184, and the structures of these elements are the same as those of corresponding elements of the first movable element 22 or those of corresponding elements of the second movable element 24 respectively, except large widths. The base plate 180 of the third connection element 18 has a width preferably larger than twice of the width of the base plate 120 of the first connection element 12 or twice of the width of the base plate 140 of the second connection element 14 to accommodate the battery 60. Accordingly, the flexible assembly 20 also includes fourth movable elements 23 and fifth movable elements 25. The fourth movable element 23 is constituted by two symmetrical plates, and each plate has a structure and shape similar to those of the part of the first movable element 22 defining the positioning slot 226 or those of the part of the second movable element 24 defining the positioning slot 246. Top surfaces of the two plates together form a continuous arc surface, the arc surface serves as a support surface, and a top portion of the arc surface is a fixing point fixed to the bottom surface of the support plate 34. Each plate defines a positioning slot 230 having the same shape and structure as the positioning slot 226 of the first movable element 22 or the positioning slot 246 of the second movable element 24. In particular, the positioning slot 230 of the left plate is slightly inclined to the left, and the positioning slot 230 of the right plate is slightly inclined to the right. Two fifth movable elements 25 are movably connected to opposite sides of the fourth movable element 23, respectively. The fifth movable element 25 has the shape and configuration substantially the same as those of the first movable element 22 or those of the second movable element 24, except that the fifth movable element 25 defines two perforations 250 at a position corresponding to the positioning slot 226 of the first movable element 22 or the positioning slot 246 of the second movable element 24. Therefore, the fifth movable element 25 has four perforations 250. According to a distance between each perforation 250 and the fourth movable element 23, the four perforations 250 are divided into two first perforations 250 adjacent to the fourth movable element 23 and two second perforations 250 remote from the fourth movable element 23. The two first perforations 250 of the fifth movable element 25 adjacent to the fourth movable element 23 are movably connected to the fourth movable element 23 through the positioning element 202, and the two first perforations 250 of the fifth movable element 25 remote from the fourth movable element 23 are movably connected to one adjacent first movable element 22 or one adjacent second movable element 24 through the positioning element 202. Preferably, the positioning element 202 connecting the fifth movable element 25 to the fourth movable element 23 includes a first positioning element 26a. The first positioning element 26a includes a first positioning shaft 260a and a second positioning shaft 262a. The first positioning shaft 260a includes a protruding post. The second positioning shaft 262a includes a screw. The protruding post has the same shape and configuration as the aforementioned protruding post, and the screw has the same shape and configuration as the aforementioned screw. The protruding post and the screw pass though the positioning slot 230 of the fourth movable element 23 and two of the perforations 250 of the fifth movable element 25, respectively. Furthermore, a distal end of the screw is further locked in one limitation element 204 after passing through the fifth movable element 250. The positioning element 202 connecting the fifth movable element 250 to one adjacent first movable element 22 or one adjacent second movable element 24 includes a second positioning element 28a. The second positioning element 28a includes a first positioning shaft 280a and a second positioning shaft 282a. The first positioning shaft 280a includes a screw. The second positioning shaft 282 includes a connection rod. The screw has the same shape and configuration as the aforementioned screw, and the connection rod has the same shape and configuration as the aforementioned connection rod. The screw and the connection rod pass though the positioning slot 226 of the first movable element 22 or the positioning slot 246 of the second movable element 24, and then pass through two of the perforations 250 of the fifth movable element 25. Furthermore, a distal end of the screw is locked in one limitation element 204 after passing through the fifth movable element 250. After passing through the fifth movable element 25, a distal end of the connection rod further passes through the fifth movable element 25 and the first movable element 22 at the opposite side of the flexible device or passes through the fifth movable element 25 and the second movable element 24 at the opposite side of the flexible device, thereby reinforcing the flexible device. Particularly, the connection rod is located in the perforation 250 of the fifth movable element 25 farthest from the fourth movable element 23, thereby defining an enough space between the two connection rods to accommodate the battery 60, and avoiding that the battery 60 cannot be placed due to a short distance between the two connection rods.

Through cooperation of the batteries 50 and 60, the service time of the flexible device can be effectively prolonged. Furthermore, since the battery 60 is arranged in the middle portion of the flexible device, when the flexible device serves as a smart bracelet, the battery 60 faces the back of the wrist, and as for the wrist, the back of the wrist is exactly a position with the highest flatness, thus the back of the wrist can effectively fit against the bottom surface of the base plate 180 of the third connection element 18, thereby reducing or eliminating human discomfort caused by inconsistent flatness of a contact surface.

Figure 19:
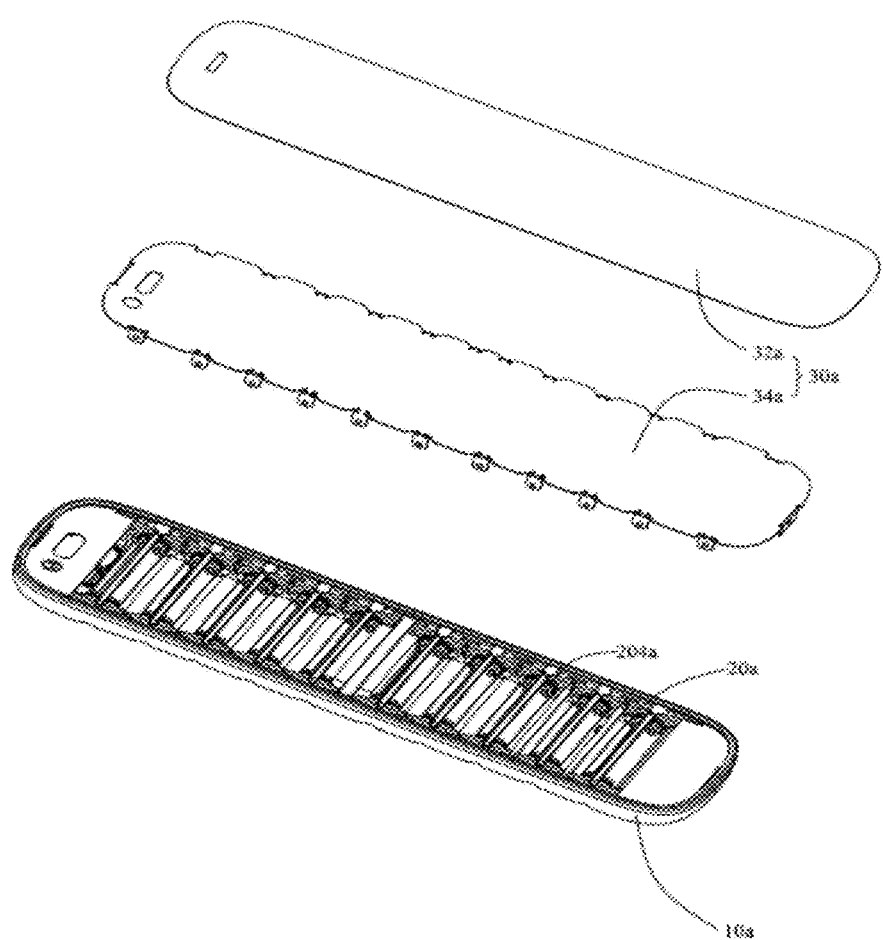
FIG. 19 is an exploded view of a flexible device according to another embodiment of the present disclosure.

Referring to FIG. 19, FIG. 19 illustrates a flexible device according to another embodiment of the present disclosure. The flexible device has a structure substantially the same as that of the aforementioned embodiment, and merely some structures are changed.

The flexible device includes a housing 10a, a flexible assembly 20a mounted in the housing 10a, and a functional element 30a arranged on the housing 10a. The flexible assembly 20a can be deformed to deform the flexible device, thereby adapting the flexible device to application requirements of different scenarios.

The flexible device is preferably deformed from a shape of a flat plate to a shape of a circular ring. When in the shape of the flat plate, the flexible device is fully unfolded, facilitating operations of a user. When in the shape of the circular ring, the whole flexible device is curled to form a wearable device, facilitating being worn on a body of the user. Certainly, shapes formed by deformation of the flexible device can be changed according to requirements, thereby adapting to requirements of more application scenarios. For example, the flexible device is switched from a shape of an arch to the shape of the circular ring, from the shape of the flat plate to a shape of a wave, from a U-shape to an S-shape, or other.

Figure 20:
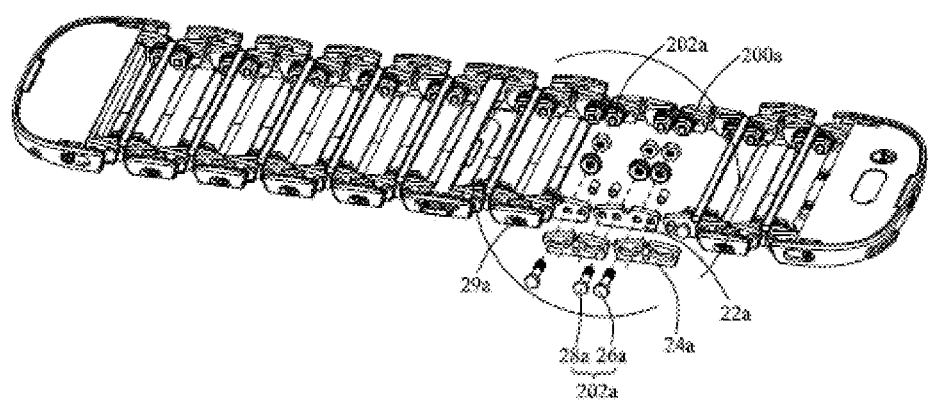
FIG. 20 is an exploded view of a movable element and a fixing element of the flexible device of FIG. 19.
Figure 21:
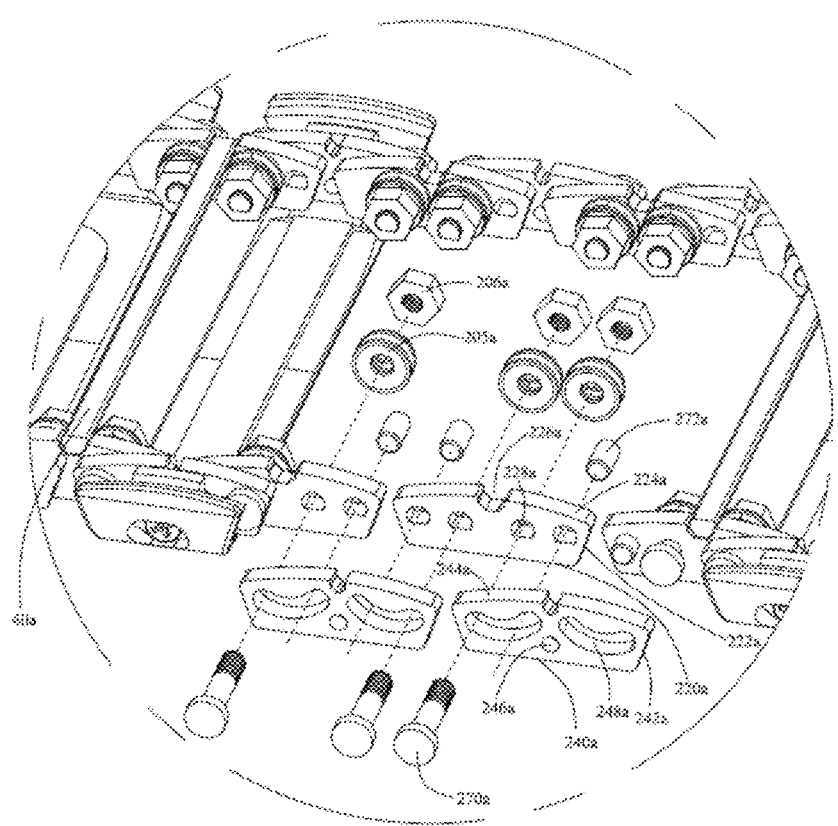
FIG. 21 is partial enlarged view of FIG. 20.

Referring to FIGS. 20-21 together, the flexible device 20a includes movable elements 200a arranged at opposite sides of the housing 10a. The movable elements 200a at each side all include a first movable element 22a and a second movable element 24a movably connected to the first movable element 22a. Multiple first movable elements 22a and multiple second movable elements 24a are included, and uniformly distributed at the opposite sides of the housing 10*a*. In other words, each side of the housing 10*a* includes multiple first movable elements 22*a* and multiple second movable elements 24*a*, and the first movable elements 22*a* are closer to an interior side of the housing 10*a* than the second movable elements 24*a*. When the flexible device is in an unfolded state, the first movable elements 22*a* at each side of the housing 10*a* are linearly aligned, and the second movable elements 24*a* at each side of the housing 10*a* are linearly aligned. Each first movable element 22*a* at each side of the housing 10*a* is not directly connected to adjacent first movable elements 22*a*, and each second movable element 24*a* at each side of the housing 10*a* is also not directly connected to adjacent second movable elements 24*a*. The first movable element 22*a* and adjacent second movable elements 24*a* at the same side of the housing 10*a* are in alternate connection. Particularly, each first movable element 22*a* and two adjacent second movable elements 24*a* are arranged side by side and in overlapped connection.

The first movable element 22*a* and the second movable element 24*a* have the same shape and different configurations. In the embodiment, the first movable elements 22*a* and the second movable elements 24*a* are all hinges. The first movable element 22*a* is substantially trapezoid-shaped, and has a flat bottom surface 220*a*, inclined side surfaces 222*a*, and a curved top surface 224*a*. The bottom surface 220*a* of the first movable element 22*a* is flat, and parallel to the undeformed functional element 30*a*. The first movable element 22*a* has two side surfaces 222*a*. Each side surface 222*a* is flat and inclined relative to the bottom surface 220*a*. Each side surface 222*a* and the bottom surface 220*a* define an obtuse angle therebetween. The obtuse angle is larger than 90 degrees and smaller than 180 degrees. Preferably, the obtuse angle is larger than 100 degrees and smaller than 110 degrees. The two side surfaces 222*a* extend upwards in opposite directions to connect the bottom surface 220*a* to the top surface 224*a*. The top surface 224*a* of the first movable element 22*a* is an arch surface of a shape of a circular arc. The top surface 224*a* has a height gradually increasing from opposite ends of the top surface 224*a* to a middle portion of the top surface 224*a* to form a convex surface. It can be understood that the top surface 224*a* may be a convex surface of other shape, for example, a convex surface of a shape of a half of a hexahedron (a convex surface similar to a trapezoid), a convex surface of a shape of a half of an octahedron (a convex surface similar to a trapezoid with a rectangle at a bottom surface of the trapezoid), a convex surface of a shape of a half of a decahedron, or other. Two connection lines each connecting one of opposite ends of an arc surface and a center of a circle where the arc surface locates define an included angle therebetween, and the included angle is defined as a span angle of the arc surface. The top surface 224*a* has a span angle larger than 10 degrees and smaller than 30 degrees.

The first movable element 22*a* defines multiple positioning holes 228*a*. Each positioning hole 228*a* cuts through a front side and a rear side of the first movable element 22*a*. The positioning hole 228*a* is substantially circular, and has a flat bottom portion to circumferentially limit an element inserted in the positioning hole 228, such that the element cannot rotate. Certainly, a top portion or a side portion of the positioning hole 228 may be flat, rather than being limited to the bottom portion. In the embodiment, four positioning holes 228*a* are included. Two of the positioning holes 228*a* are adjacent to the left side of the first movable element 22*a*, and the other two of the positioning holes 228*a* are adjacent to the right side of the first movable element 22*a*. The four positioning holes 228*a* are linearly arranged at intervals. A distance between two left positioning holes 228*a* is equal to that between two right positioning holes 228, and shorter than that between two middle positioning holes 228. The first movable element 22*a* further defines a positioning slot 226*a* on a top surface thereof. The positioning slot 226*a* cuts through the front side and the rear side of the first movable element 22*a*, and extends through the top surface 224*a* upwardly. The positioning slot 226*a* is in the middle portion of the top surface 224*a*, and located above the four positioning holes 228*a*. The positioning slot 226*a* has two sidewalls inclined relative to each other and a flat bottom surface. A distance between the two sidewalls gradually increases in an upward direction, such that the positioning slot 226*a* is in a shape of a trapezoid that gradually widens from bottom to top. The sidewalls and the bottom surface are all flat, thereby facilitating cooperation with an element inserted in the positioning slot 226*a*.

The second movable element 24*a* is substantially trapezoid-shaped, and has a flat bottom surface 240*a*, inclined side surfaces 242*a*, and a curved top surface 244*a*. The bottom surface 240*a* of the second movable element 24*a* is flat, and parallel to the undeformed functional element 30*a*. The second movable element 24*a* has two side surfaces 242*a*. Each side surface 242*a* is flat, and inclined relative to the bottom surface 240*a*. Each side surface 242*a* and the bottom surface 240*a* define an obtuse angle therebetween. The obtuse angle is larger than 90 degrees and smaller than 180 degrees. Preferably, the obtuse angle is larger than 100 degrees and smaller than 110 degrees. The two side surfaces 242*a* extend upwards in opposite directions to connect the bottom surface 240*a* to the top surface 244*a*. The top surface 244*a* of the second movable element 22*a* is an arch surface of a shape of a circular arc, and forms a support surface of the second movable element 24*a*. The top surface 244*a* has a height gradually increasing from opposite ends of the top surface 224*a* to a middle portion of the top surface 224*a* to form a convex surface. The top surface 244*a* has a span angle larger than 10 degrees and smaller than 30 degrees. It can be understood that the top surface 224*a* may be a convex surface of other shape, for example, a convex surface of a shape of a half of a hexahedron, a convex surface of a shape of a half of an octahedron, a convex surface of a shape of a half of a decahedron, or other.

The second movable element 24*a* defines two positioning slots 248*a* adjacent to the left side and right side of the second movable element 24*a*, respectively. The positioning slot 248*a* cuts through a front side (an exterior surface of the second movable element 24*a*) and a rear side (an interior surface of the second movable element 24*a*) of the second movable element 24*a*. The positioning slot 248*a* is in a shape of a circular arc, and has a bending direction opposite to that of the top surface 244*a*. The positioning slot 248*a* has a height gradually decreasing from opposite ends of the positioning slot 248*a* to a middle portion of the positioning slot 248*a*. The positioning slot 248*a* has a first arc surface, a second arc surface, and two connection arc surfaces to connect the first arc surface to the second arc surface. The first arc surface is parallel to the second arc surface, and the first arc surface and the second arc surface have a same center. The first arc surface is shorter than the second arc surface. The connection arc surfaces are substantially semi-circular, thereby forming rounded corners at the opposite ends of the positioning slot 248*a*. The positioning slot 248*a* has a larger span angle than the top surface 244*a*. Preferably, the span angle of the positioning slot 248*a* is larger than 70 degrees and smaller than 90 degrees. The two positioning slots 248*a* are symmetrically arranged along a center line of the second movable element 24a, and have opposite bending directions. The left positioning slot 248a curves downwards and towards the right slightly, and the right positioning slot 248a curves downwards and towards the left slightly. The second movable element 24a further defines a fixing hole 246a. The fixing hole 246a extends through the front side and the rear side of the second movable element 24a. The fixing hole 246a is located between the two positioning slots 248a, and located below the two positioning slots 248a. The fixing hole 246a has a smaller diameter than the positioning hole 228a, and is located below the positioning hole 228a.

The flexible device 20a further includes positioning elements 202a connected to the movable elements 200a. Particularly, the first movable element 22a and adjacent second movable elements 24a are in staggered connection via the positioning elements 202a. Part of the front side of the first movable element 22a is in contact with part of the rear side of the second movable element 24a. The positioning element 202a can slide in the positioning slot 248a, such that the first movable element 22a can move relative to the second movable element 24a. In the embodiment, the positioning element 202a includes a first positioning element 26a and a second positioning element 28a. The first positioning element 26a connects the first moveable element 22a to one adjacent second movable element 24a, and the second positioning element 28a connects the first movable element 22a to another adjacent second movable element 24a. The second positioning element 28a and the first positioning element 26a may have the same structure or different structures. In the embodiment, the second positioning element 28a includes a first positioning shaft 270a and a second positioning shaft 272a, and the first positioning element 26a includes a first positioning shaft 270a and a second positioning shaft 272a. The first positioning shaft 270a and the second positioning shaft 272a of the first positioning shaft 26a pass through two right positioning holes 228a of the first movable element 22a, respectively, and then pass through the left positioning slot 248a of one adjacent second movable element 24a. The first positioning shaft 270a and the second positioning shaft 272a of the second positioning element 28a pass through two left positioning holes 228a of the first movable element 22a, respectively, and then pass through the right positioning slot 248a of another adjacent second movable element 24a. The first positioning shaft 270a and the second positioning shaft 272a of the first positioning element 26a are spaced apart from each other, and a distance between the first positioning shaft 270a and the second positioning shaft 272a of the first positioning element 26a remains unchanged during deformation of the flexible assembly 20a. The first positioning shaft 270a and the second positioning shaft 272a of the second positioning element 28a are spaced apart from each other, and a distance between the first positioning shaft 270a and the second positioning shaft 272a of the second positioning element 28a remains unchanged during the deformation of the flexible assembly 20a. The first positioning shaft 270a is longer than the second positioning shaft 272a, and the first positioning shaft 270a is closer to a center of the first movable element 22a than the second positioning shaft 272a.

The first positioning shaft 270a and the second positioning shaft 272a of the second positioning element 28a may have the same structure or different structures. The first positioning shaft 270a and the second positioning shaft 272a of the first positioning element 26a may have the same structure or different structures. The first positioning shaft 270a of the second positioning element 28a and the first positioning shaft 270a of the first positioning element 26a may have the same structure or different structures, or the first positioning shaft 270a of the second positioning element 28a and the second positioning shaft 272a of the first positioning element 26a may have the same structure or different structures. The second positioning shaft 272a of the second positioning element 28 and the first positioning shaft 270a of the first positioning element 26a may have the same structure or different structures, or the second positioning shaft 272a of the second positioning element 28a and the second positioning shaft 272a of the first positioning element 26a may have the same structure or different structures. In the embodiment, the first positioning shaft 270a and the second positioning shat 272a of the second positioning element 28a have different structures, the first positioning shaft 270a and the second positioning shat 272a of the first positioning element 26a have different structures, the first positioning shaft 270a of the second positioning element 28a and the first positioning shaft 270a of the first positioning element 26a have the same structure, and the second positioning shaft 272a of the second positioning element 28a and the second positioning shaft 272a of the first positioning element 26a have the same structure. The first positioning shaft 270a of the first positioning element 26a includes a screw consisted of a nut and a threaded rod extending perpendicularly from the nut. The first positioning shaft 270a of the first positioning element 26a sequentially passes through the positioning slot 248a of the second movable element 24a and one positioning hole 228a of one adjacent first movable element 22a from front to back. The nut abuts against the front side of the second movable element 24a to prevent the first positioning shaft 270a from falling off. The second positioning shaft 272a of the first positioning element 26a includes a protruding post of a rod shape. The protruding post passes through the positioning hole 228a of the first movable element 22a and the positioning slot 248a of one adjacent second movable element 24a. The first positioning shaft 270a of the first positioning element 26a and the first positioning shaft 270a of the second positioning element 28a are symmetrically arranged with respect to the center line of the first movable element 26a, and the second positioning shaft 272a of the first positioning element 26a and the second positioning shaft 272a of the second positioning element 28a are symmetrically arranged with respect to the center line of the first movable element 26a. The first positioning shaft 270a of the second positioning element 28a includes a screw consisted of a nut and a threaded rod extending perpendicularly from the nut. The first positioning shaft 270a of the second positioning element 28a sequentially passes through the positioning slot 248a of the second movable element 24a and one positioning hole 228a of one adjacent first movable element 22a from front to back. The nut abuts against the front side of the second movable element 24a to prevent the first positioning shaft 270a from falling off. The second positioning shaft 272a of the second positioning element 28a includes a protruding post of a rod shape. The protruding post passes through the positioning hole 228a of the first movable element 22a and the positioning slot 248a of one adjacent second movable element 24a. The first positioning shafts 270a and the second positioning shafts 272a all have a diameter equal to or slightly smaller than a width of the positioning slot 248a, thereby achieving tight fit in the positioning slots 248a. A distance between the first positioning shaft 270a and the second positioning shaft 272a of the first positioning element 26a is shorter than a length of the positioning slot 248a, or a distance between the first positioning shaft 270a and the second positioning shaft 272a of the second positioning element 28a is shorter than a length of the positioning slot 248a, such that the first positioning shaft 270a and the second positioning shaft 272a can slide in the positioning slot 248a, thereby driving the second movable element 24a to move relative to the first movable element 22a.

When the flexible device is in a first sate (e.g., an unfolded state in the shape of the flat plate), the second movable element 24a is unfolded relative to the first movable element 22a. The second movable element 24a and the first movable element 22a are arranged side by side and flush with each other. The first positioning shaft 270a of the first positioning element 26a abuts against a first distal end of the positioning slot 248a of the second movable element 24a. The second positioning shaft 272a of the first positioning element 26a is spaced apart from a second distal end of the positioning slot 248a of the second movable element 24a. The first distal end and the second distal end are located at opposite ends of the positioning slot 248a. When the flexible device is in a second state (e.g., a folded state in the shape of the circular ring), the second movable element 24a is folded relative to the first movable element 22a. The second movable element 24a and the first movable element 22s are arranged side by side to define an included angle therebetween, and the second movable element 24a is inclined relative to the first movable element 22a. The first positioning shaft 270a of the first positioning element 26a is spaced apart from the first distal end of the positioning slot 248a of the second movable element 24a, and the second positioning shaft 272a of the first positioning element 26a abuts against the second distal end of the positioning slot 248a of the second movable element 24a. Similarly, when in different states, the second positioning element 28a has position relationships similar to that of the first positioning element 26a, which will not be repeated herein.

Similar to the aforementioned embodiment, in the embodiment, the second movable element 24a includes a rotation center O relative to the first movable element 22a, and is located above the top surface 224a of the first movable element 22a, and preferably located at an upper position of an inside of the functional element 30a, thereby ensuring that the functional element 30a is not stretched or compressed during the deformation of the flexible device. Particularly, the rotation center O is located above a support plate 34a of the functional element 30a, and located at an upper position of an inside of a flexible functional screen 32a.

To ensure that the flexible device can be self-positioned at any position during the deformation of the flexible device, the flexible assembly 20a further includes limitations 204 to adjust a damping value. The limitation element 204a is movably sleeved on the positioning element 202a to control a force applied to the movable element 200a, thereby adjusting the damping value during the deformation of the flexible assembly 20. Particularly, after passing through the positioning holes 228a, the first positioning shaft 270a of the second positioning element 28a and the first positioning shaft 270a of the first positioning element 28a are all locked with the limitation elements 204. In the embodiment, the limitation element 204a is a locking element 206a (i.e., nut) with an elastic tab 205, and the locking element 206a and a distal end of the first positioning shaft 270a are in threaded engagement. The elastic tab 205a elastically abuts against the rear side of the first movable element 22a, and is sandwiched between the nut and the rear side of the first movable element 22a. Furthermore, by adjusting locking between the limitation element 204a and the first positioning shaft 270a, an elastic force applied to the first movable element 22a by the elastic tab 205a can be adjusted, thereby adjusting the damping value during rotation of the flexible assembly 20a. When the damping value is adjusted to be proper, the flexible assembly 20a can be positioned at any position during the rotation, thereby adapting to more shape requirements.

Particularly, in the embodiment, the first positioning shaft 270a and the second positioning shaft 272a of the first positioning element 26a both have a flat bottom surface, and the first positioning shaft 270a and the second positioning shaft 272a of the second positioning element 28a both have a flat bottom surface, so as to engage with the flat surfaces of the positioning holes 228a of the first movable element 22a to realize circumferential limitation. That is to say, after passing through the positioning holes 228a, the flat surfaces of the first positioning shafts 270a and the second positioning shafts 272a abut against the flat surfaces of the positioning holes 228a, thereby preventing rotation of the first positioning shafts 270a and the second positioning shafts 272a in the positioning holes 228a.

In the embodiment, the positioning holes 228a in the first movable elements 22a is defined to be abutted against the limitation elements 204a, which can reduce or prevent abrasion of the elastic tabs 205a. In the aforementioned embodiment, the elastic tab 272 directly abuts against the second movable element 24. Since the second movable element 24 moves and rotates during the deformation of the flexible device, and the elastic tab 272 is fixed relative to the first movable element 22, thus friction between the elastic tab 272 and a surface of the second movable element 24 is generated during movement and rotation of the second movable element 24. After prolonged use, the elastic tab 272 is worn out due to the friction, thereby affecting the damping value of the flexible device. Therefore, in the embodiment, the elastic tab 205a abuts against the first movable element 22a fixed relative to the elastic tab 205a during the deformation of the flexible device. Since the first movable element 22a is fixed relative to the elastic tab 205a, the first movable element 22a does not move during the deformation of the flexible device, thereby avoiding scratching of a surface of the elastic tab 205a and a surface of the first movable element 22a, and reducing or avoiding the abrasion of the elastic tab 205a. Furthermore, the first positioning element 26a and the second positioning element 28a cannot rotate in the positioning holes 228a due to limitation of the flat surfaces, such that the elastic tab 205a sleeved on the first positioning shaft 270a cannot rotate relative to the first movable element 22a. Therefore, by means of the above manner, the elastic tab 205 not only cannot move relative to the first movable element 22a, but also cannot rotate relative to the first movable element 22a, thus a constant position relationship between the elastic tab 205a and the first movable element 22a can be ensured to a greatest extent, and it is advantageous for preventing the elastic tab 205a from being worn out.

In another aspect, although in the aforementioned embodiment the rotation center O of the second movable element 24 is set to be located above the support plate 34 to avoid stretching or compression of the functional element 30, since the support plate 34 is directly soldered to the top portion of the first movable element 22 and the top portion of the second movable element 24, it cannot be ensured that each element is precisely in a desired position due to an assembly and element dimensional tolerance. Thus, during the deformation of the flexible device, a situation that the support plate 34 and the functional element 30 are still stretched or compressed due to the tolerance may occur easily. Thus, in the embodiment, the support plate 34a having a different structure and assembly manner is adopted to provide a tolerance range for the tolerance.

Figure 22:
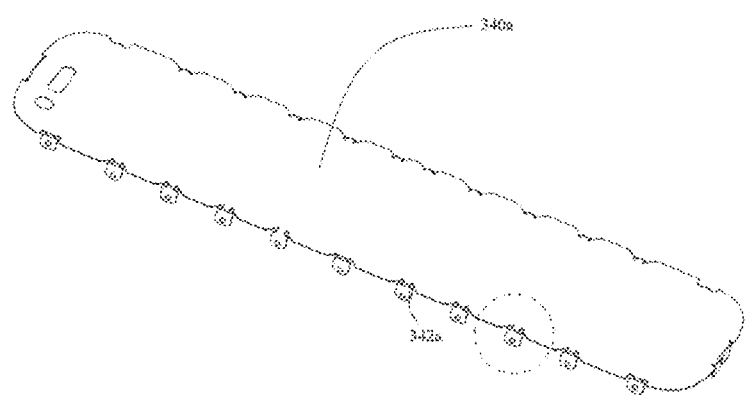
FIG. 22 is an enlarged view of a support plate of FIG. 19.
Figure 23:
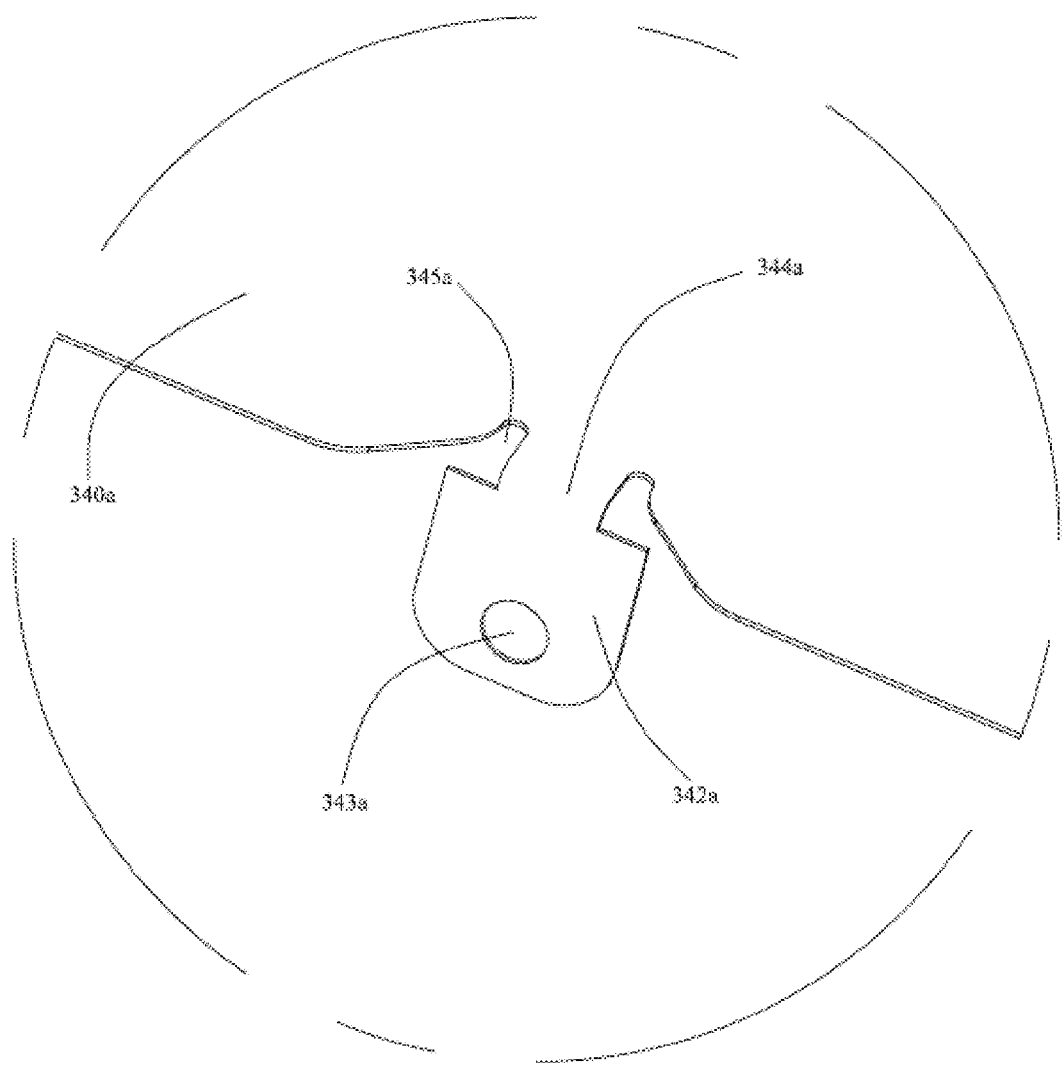
FIG. 23 is a partial enlarged view of FIG. 22.
Figure 24:
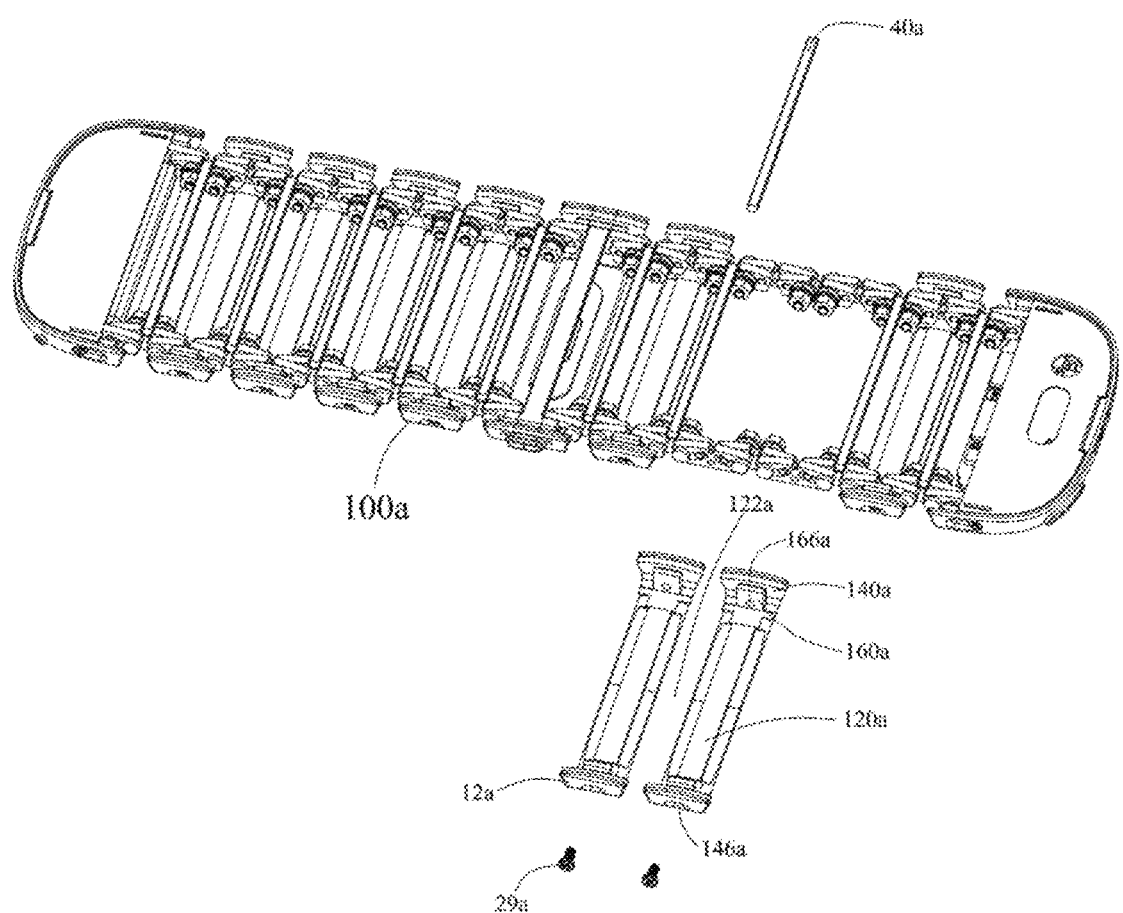
FIG. 24 is an exploded view of a first connection element of the flexible device of FIG. 19.
Figure 25:
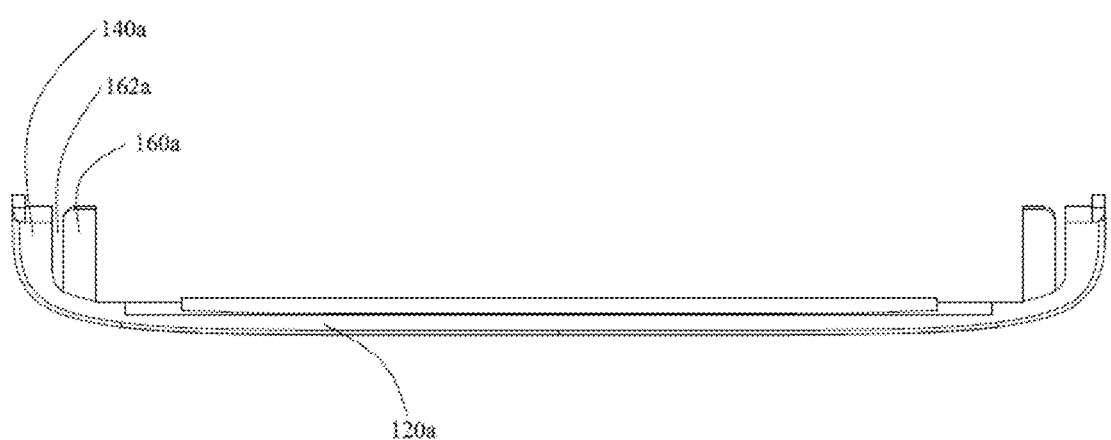
FIG. 25 is a side view of the connection element of FIG. 24.
Figure 26:
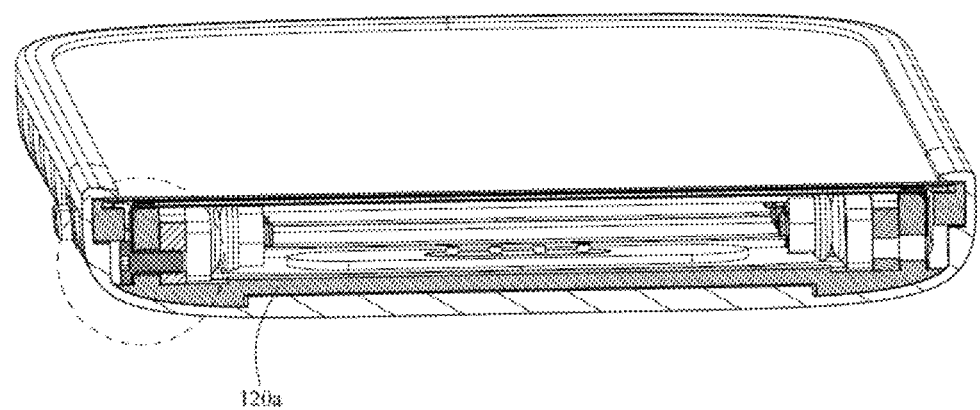
FIG. 26 is a sectional view of a flexible device according to another embodiment of the present disclosure.
Figure 27:
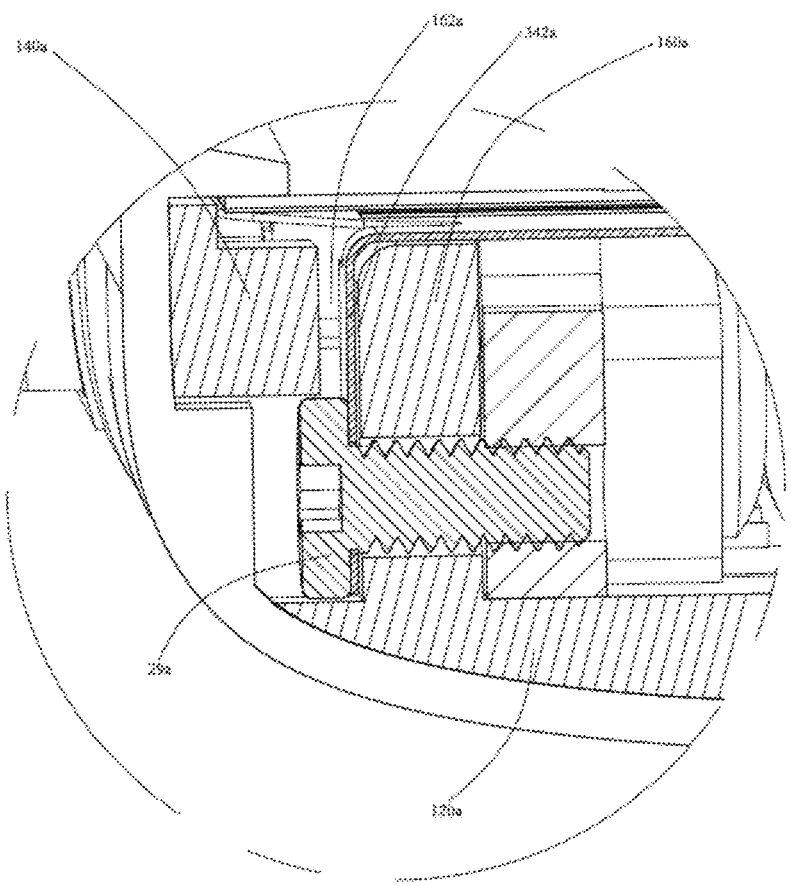
FIG. 27 is a partial enlarged view of FIG. 26.

Referring to FIGS. 22-23 together, the functional element 30a includes the support plate 34a and the flexible functional screen 32a attached to the support plate 34a. The flexible functional screen 32a has the same structure as the flexible functional screen 32 in the aforementioned embodiment. The support plate 34a and the support plate 34 in the aforementioned embodiment are made of the same material, and may be integrally formed by metal sheets. The support plate 34a is made of a rigid material having elastic deformation of a certain degree. The support plate 34a includes a plate body 340a and fixing sheets 342a extending from opposite sides of the plate body 340a. An area of the plate body 340a is equal to or larger than that of the flexible functional screen 32a, and supports the flexible functional screen 32a of the functional element 30a. Each side of the plate body 340a includes multiple fixing sheets 342a. Each fixing sheet 342a is formed by integral bending of the plate body 340a. Each fixing sheet 342a is perpendicular to the plate body 340a. Each fixing sheet 32 defines a fixing hole 343a. Each fixing sheet 342a is connected to the plate body 340a via a connection sheet 344a. The connection sheet 344a is curved and arc-shaped. The connection sheet 344a has an end connected to the plate body 340a, and another end connected to the fixing sheet 342a. The connection sheet 344a is narrower than the fixing sheet 342a. The support plate 34a defines two recesses 345a recessed inwardly at opposite sides of the connection sheet 344a, respectively. The two recesses 345a are symmetrically arranged with respect to a center line of the connection sheet 344a. Each recess 345a has a width gradually increasing along a direction toward the fixing sheet 342a to form a shape substantially similar to a triangle. Each recess 345a extends through an upper surface and a lower surface of the plate body 340a. The recesses 345a are to reduce or prevent deformation of the plate body 340a at positions adjacent to the connection sheet 344a due to bending of the fixing sheet 342a, thereby maintaining the shape of the plate body 340a. Preferably, a ratio of a depth of the recess 345 to the width of the connection sheet 344a ranges from 1 to 2.

In assembly, the fixing hole 343a of each fixing sheet 342a of the support plate 34a is aligned with the fixing hole 246a of each second movable element 24a of the flexible assembly 20a, a fixing element 29a (a screw as illustrated in FIG. 20) passes through the fixing hole 343a of the fixing sheet 342a and then is locked in the fixing hole 246a of the second movable element 24a, thereby locking the fixing sheet 342a to the second movable element 24a. Under this condition, a bottom portion of the plate body 340a separably abuts against the top portion of the first movable element 22a and the top portion of the second movable element 24a. The fixing sheet 342a is fixed to a side of the second movable element 24a. During the deformation of the flexible assembly 20a, the second movable element 24a drives the fixing sheet 342a to rotate and move, thereby deforming the plate body 340a to form various desired shapes. A diameter of the fixing hole 343a of the fixing sheet 342a is slightly larger than that of the screw, such that a small space is reserved for movement of the screw in the fixing hole 343a. The space for the movement of the screw can offset the element tolerance or the assembly tolerance, avoiding stretching or compression due to soldering in the aforementioned embodiment. Furthermore, since the fixing sheet 342a of the support plate 34a is connected to the plate body 340a via the connection sheet 344a having a small width, thus the fixing sheet 342a has a certain degree of flexibility in an up and down direction (i.e., a vertical direction) via the connection sheet 344a, thereby further offsetting the element tolerance or the assembly tolerance.

In the embodiment, the support plate 34a is fixed to the flexible assembly 20a via the fixing sheets 342a, that is, the bottom surface of the plate body 340a of the support plate 34a is not directly connected to the first movable elements 22a and the second movable elements 24a of the flexible assembly 20a.

It is to be understood that, actually, to eliminate at least part of the problem incurred by the element tolerance or the assembly tolerance, what needs to be ensured is just that the bottom surface of the plate body 340a of the support plate 34a is separably in contact with the first movable elements 22a and the second movable elements 24a. Even if the fixing sheet 342a of the support plate 34a is thoroughly fixed to the side of the second movable element 24a (e.g., fixing the fixing sheet 342a to the side of the second movable element 24a via soldering), since the plate body 340a movably abuts against the top surface 224a of the first movable element 22a and the top surface 244a of the second movable element 24a, the plate 340a can slightly move relative to the top surface 224a of the first movable element 22a and the top surface 244a of the second movable element 24a to offset the element tolerance or the assembly tolerance. Furthermore, the fixing sheet 342a has certain deformation to offset the element tolerance or the assembly tolerance. Therefore, even if the fixing sheet 342a is fixed in a manner without a screw, reducing or offsetting the element tolerance or the assembly tolerance can be stilled achieved.

In the embodiment, the first positioning element 26a and the second positioning element 28a both have a short length, and different from the aforementioned embodiment, the first positioning element 26a and the second positioning element 28a do not connect opposite sides of the flexible device together, such that the flexible device has more space to accommodate various electronic components. However, due to lack of elements connecting the opposite sides of the flexible device together, the flexible device has low structural stability. To reinforce the flexible device, in the embodiment, connection rods 40a passing through the opposite sides of the flexible device are included. The connection rod 40a is elongated, has an end inserted in the fixing slot 226a of the first movable element 22a at one side of the flexible device, and another end inserted in the fixing slot 226a of the opposite first movable element 22a at the other side of the flexible device. The connection rod 40a has a shape matched with a shape of the fixing slot 226a, and includes a horizontal bottom surface and two inclined side surfaces. The bottom surface of the connection rod 40a abuts against a bottom of the fixing slot 226a, and the side surface abuts against a sidewall of the fixing slot 226a, thereby limiting the connection rod 40a in the fixing slot 226a to avoid circumferential rotation. Through the connection rod 40a, the first movable elements 22a at the left and right sides of the flexible device can be further fixed to further stabilize the flexible device. Preferably, the connection rod 40a can be fixed in the fixing slots 226a at the opposite sides of the flexible device via soldering. Since the connection rod 40a is located on the top of the first movable element 22a, the connection rod 40a does not affect the inner space of the flexible device greatly, such that the flexible device can accommodate more electronic components.

Similar to the aforementioned embodiment, the flexible device in the embodiment may merely include the first positioning shaft 270a, and the first positioning element 26a is the first positioning shaft 270a, correspondingly, the positioning slot 248a of the second movable element 24a is correspondingly shortened; the second positioning element 28a may merely include the first positioning shaft 270a, and the second positioning element 28a is the first positioning shaft 270a, correspondingly, the positioning slot 248a of the second movable element 24a is correspondingly shortened. An effect realized by using both the first positioning shafts 270a and the second positioning shafts 272a can also be realized by merely using the first positioning shafts 270a. It is to be understood that under an extreme condition, each side of the flexible assembly 20a may include only one first movable element 22a and only one second movable element 24a, or only one side of the flexible assembly 20a include only one first movable element 22a or only one second movable element 24a, and the flexible assembly 20a may be even arranged in the middle of the housing 10a, such that when the flexible assembly 20a includes only one first movable element 22a and only one second movable element 24a, shape switching of the flexible device can be still realized, and it can be still ensured that the functional element 30a is not stretched or slightly stretched.

Referring to FIGS. 24-27 together, the housing 10a includes multiple connection elements 100a. The connection elements 100a include multiple first connection elements 12a having the same shape and structure. The first connection elements 12a may be made of a hard material such as plastic, metal, or the like, so as to protect electronic components in the housing 10a. The first connection element 12a includes a base plate 120a and sidewalls 140a extending upwards from opposite ends of the base plate 120a. Each sidewall 140a forms a flange on a top portion thereof adjacent to an exterior side thereof. The flange abuts against the plate body 340a of the support plate 34a to position the plate body 340a. The first connection element 12a further includes two protruding baffles 160a. The two baffles 160a are adjacent to the opposite sidewalls 140a, respectively, and each baffle 160a is spaced apart from the adjacent sidewall 140a by an interval 162a. Each baffle 160a has a height substantially equal to that of the adjacent sidewall 140a. Each sidewall 140a defines a fixing hole 146a, the adjacent baffle 160a also defines a fixing hole 166a, and the fixing holes 146a and 166a are both aligned with the fixing holes 246a of the corresponding second movable elements 24a.

The first movable elements 22a and the second movable elements 24a at one side of the flexible device are located on the top surfaces of the base plates 120a of the first connection elements 12a, and adjacent to the baffles 160a at the same side. The first movable elements 22a and the second movable elements 24a at the other side of the flexible device are located on the top surfaces of the base plates 120a of the first connection elements 12a, and adjacent to the baffles 160a at the same side. An exterior surface of the second movable element 24a abuts against an interior surface of the baffle 160a, so as to be limited to the connection element 100a. The fixing sheet 342a of the support plate 34a is inserted in the gap 162a between the baffle 160a and the adjacent sidewall 140a. The fixing element 29a sequentially passes through the fixing hole 146a of the sidewall 140a of the first connection element 12a, the fixing hole 343a of the fixing sheet 342a, and the fixing hole 166a of the baffle 160a, and is locked in the fixing hole 246a of the second movable element 24a, thereby fixing the connection element 100a, the support plate 34a, and the second movable element 24a.

When the flexible device is in the first state, the second state, or other state between the first state and the second state, adjacent first connection elements 12a are always spaced apart from each other to define a groove 122a. In other words, during the deformation of the flexible assembly 20a, the first connection elements 12a move relative to each other but are always spaced apart from each other.

Figure 28:
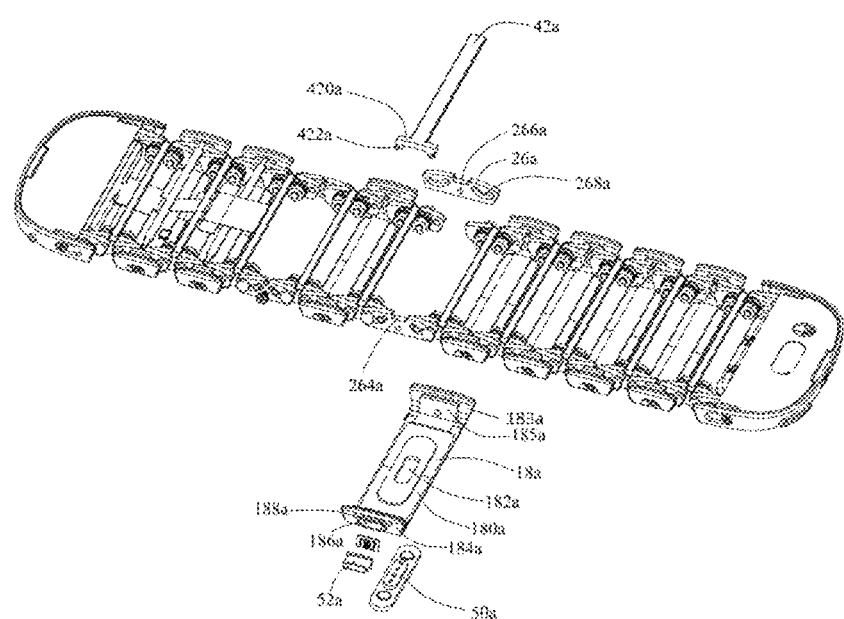
FIG. 28 is an exploded view of a second connection element of the flexible device of FIG. 19.
Figure 29:
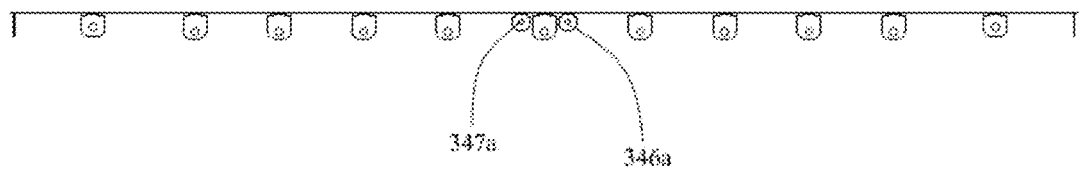
FIG. 29 is a front view of a support plate of FIG. 19.

Referring to FIGS. 28-29 together, the housing 10a further includes a second connection element 18a. A structure of the second connection element 18a is similar to that of the first connection element 12a, and a difference is merely that the second connection element 18a is wider than the first connection element 12a. For names and relative position relationships of elements of the second connection element 18a, reference can be made to the first connection element 12a. Particularly, a base plate 180a of the second connection element 18a defines a through groove 182 in a middle portion thereof to accommodate a connection terminal 50a. The connection terminal 50a is coupled with an external charging device to charge the flexible device or coupled with an external data processing device to transmit data. The second connection element 18a further defines a switch hole 186a on a front sidewall 184a thereof to accommodate a switch assembly 52a, thereby realizing on or off of the flexible device. The front sidewall 184a of the second connection element 18a further defines two through holes 188a on the left and right side of the switch hole 186a, respectively. The second connection element 18a merely includes a baffle 185a at a rear sidewall 183a thereof, and the baffle 185a is also spaced apart from the rear sidewall 183a by a gap.

The flexible device 20a further includes third movable elements 26a located on the second connection elements 18a. Two third movable elements 26a are arranged at a front side and a rear side of the second connection element 18a, respectively, and each third movable element 26a is movably connected to two first movable elements 22a at the same side. The third movable element 26a has the same configuration as the second movable element 24a, and only lengths are different. In the embodiment, the length of the third movable element 26a is longer than that of the second movable element 24a. Names, positions, and relative position relationships of elements of the third movable element 26a are similar to those of the elements of the second movable element 24a, respectively. The third movable element 26a also defines two positioning slots 268a and a fixing whole 266a located between the positioning slots 268a. The two positioning slots 268a of the third movable element 26a have the same orientation as the two positioning slots 248a of the second movable element 24a, and a distance between the two positioning slots 268a of the third movable element 26a is longer than that between the two positioning slots 248a of the second movable element 24a. The third movable element 26a further defines a fixing slot 264a on a top surface thereof. The fixing slot 264a of the third movable element 26a is wider than the fixing slot 226a of the first movable element 22a.

Furthermore, the flexible device further includes a connection beam 42a located above the second connection element 18a. The connection beam 42a has a larger size than the connection rod 40 at the other position. In the embodiment, the connection beam 42 located above the second connection element 18a is wider and longer than the connection rod 40a at the other position. The connection beam 42a forms a positioning block 420a on a front end thereof, and the positioning block 420 forms two bumps 422a on a front surface thereof. The connection beam 42a has a rear end inserted in the fixing slot 264a of the third movable element 26a at the rear side of the flexible device, and a front end inserted in the fixing slot 264a of the third movable element 26a at the front side of the flexible device. The positioning block 420a abuts against the front surface of the third movable element 26a and a rear surface of the front sidewall 184a of the second connection element 18a, and the bump 422a is inserted in the through hole 188a of the second connection element 18a, thereby reinforcing the whole flexible device. Furthermore, the support plate 34a defines two small fixing sheets 346a at positions corresponding to the two through holes 188a of the second connection element 18a, respectively. Each fixing sheet 346a defines a positioning hole 347a aligned with the through hole 188a. The small fixing sheet 346a is inserted in a gap defined between the sidewall 184a of the second connection element 18a and the positioning block 420a. The bump 422a of the positioning block 420a is further inserted in the fixing hole 347a of the fixing sheet 346a to be connected to the support plate 34a.

Figure 30:
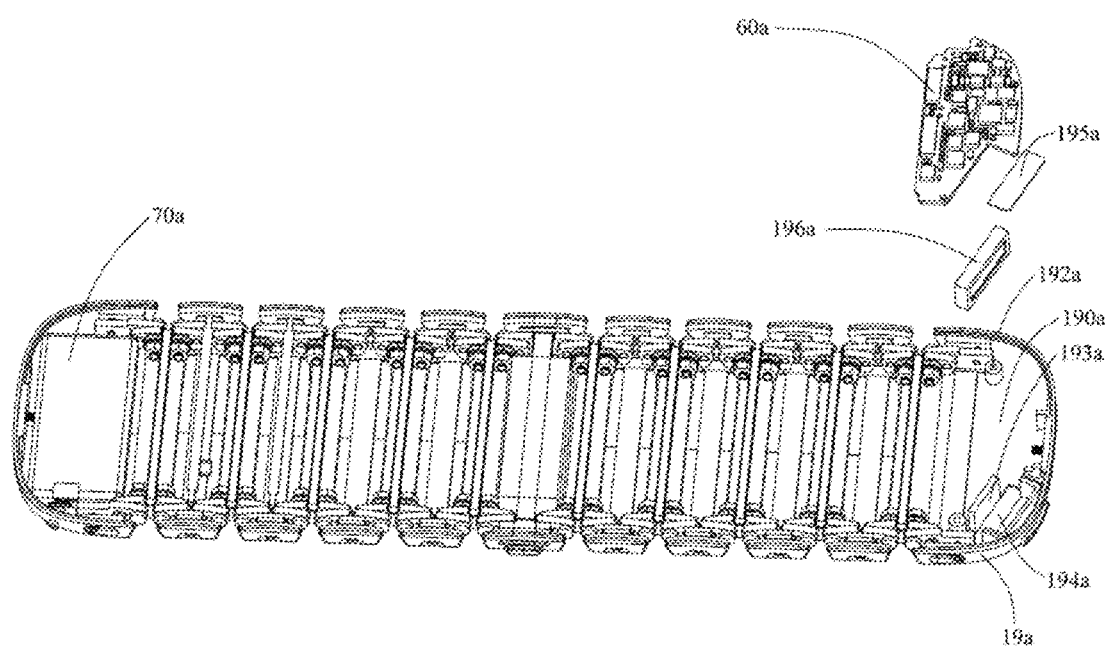
FIG. 30 is an exploded view of an end cap of the flexible device of FIG. 19.
Figure 31:
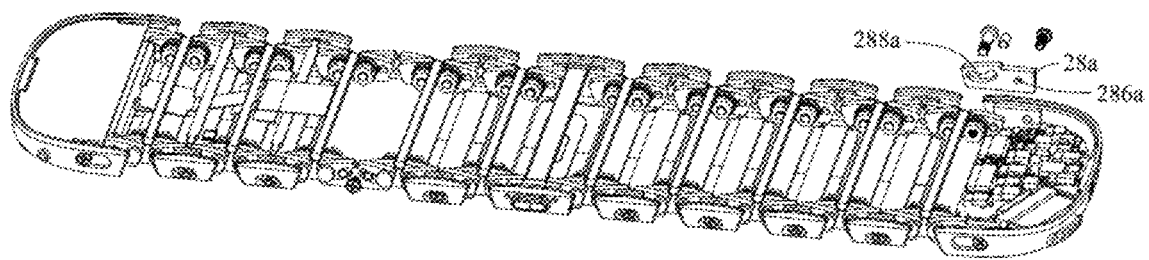
FIG. 31 is an exploded view of a fourth movable element of the flexible device of FIG. 19.

Referring to FIGS. 30-31 together, similar to the aforementioned embodiment, considering that electronic components such as a controller 60a, a battery 70a, and a communication module are not resistant to bending, in order to protect the electronic components, the housing 10a further includes two end caps 19a disposed at opposite ends of the housing 10a, respectively. The two end caps 19a have the same structure and are arranged symmetrically. The end cap 19a, the first connection element 12a, and the second connection element 18a may be made of the same rigid material. Each end cap 19a includes a base plate 190a and a sidewall 192a extending upwardly from an edge of the base plate 190a. The base plate 190a is substantially semicircular, and an area of the base plate 190a is larger than that of the base plate 120a of the first connection element 12a or that of the base plate 180a of the second connection element 18a, and larger than a sum of the area of the base plate 120a of the first connection element 12a and the area of the base plate 180a of the second connection element 18a. The sidewall 192a forms a flange on a top surface thereof adjacent to an exterior side thereof. The plate body 340a of the support plate 34a abuts against the top surface of the sidewall 192a and an interior side of the flange. Since the area of the base plate 190a of the end cap 19a is large, a large receiving space can be provided to accommodate the electronic components that are not resistant to bending. For example, the battery 70a can be accommodated in one of the end caps 19a, and the electronic components such as the controller 60a, the communication module, and a circuit board can be accommodated in the other end cap 19a. The battery 70a is coupled with the controller 60a, the communication module, and the circuit board by wires or flexible circuit boards. The flexible touch screen or flexible display screen is coupled with the circuit board through a flexible circuit board to achieve electrical connection with the controller 60a, the communication module, and the battery 70. Since the battery 70a and the controller 60a are located within the two end caps 19a, respectively, the battery 60a and the controller 60a are also located at the opposite ends of the flexible assembly 20a, respectively. The battery 70a and the controller 60a also move following the deformation of the flexible assembly 20a, thereby changing a distance between the battery 70a and the controller 60a. In particular, the distance between the battery 70a and the controller 60a gradually decreases as the flexible assembly 20a is deformed to the second state.

By arranging the battery 70a and the other electronic components in the two separate end caps 19a, respectively, an internal space of the flexible device can be effectively saved, making the flexible device thinner and lighter. Moreover, the design that the battery 70a is separated from the other electronic components can also prevent heat generated by the battery 70a and the other electronic components from interacting with each other, thereby ensuring that the battery 70a and the other electronic components can operate normally.

In particular, the right end cap 19a further defines a sound chamber 194a therein for receiving a speaker 196a. The sound chamber 194a is formed by multiple vertical partitions 193a. The speaker 196a is interposed between the partitions 193a, and the sound chamber 194a is covered by a cover plate 195a. The right end cap 19a also defines multiple sound holes corresponding to the sound chamber 194a for outputting sound from the speaker 196a.

In the embodiment, the flexible assembly 20a further includes fourth movable elements 28a. The fourth movable element 28 is located in the end cap 19a to connect the first movable element 22a or the second movable element 24a to the end cap 19a. The left portion of the fourth movable element 28a has the same structure and shape as the left portion of the second movable element 24a. The left portion of the fourth movable element 28a also defines a positioning slot 288a. The right portion of the fourth movable element 28a is rectangular, and defines a through hole 286a in a middle portion thereof to allow the positioning element 202a to pass through and be locked to the sidewall 192a of the end cap 19a.

In the embodiment, the top surface 224a of the first movable element 22a and the top surface 244a of the second movable element 24a are in a shape of a circular arc. After rotation of the second movable element 24a around the first movable element 22a, the top surfaces 224a of the second movable elements 24a and the top surfaces 244a of the first movable elements 22a together form a continuous arc surface (curvatures of the top surfaces 224a of the first movable elements 22a and curvatures of the top surfaces 244a of the second movable elements 24a are continuously distributed), such that the entire flexible device forms a circular ring. Furthermore, a projection of the top surface 224a of each first movable element 22a on a plane perpendicular to the top surface 224a and a projection of the top surface 244a of each second movable element 24a on a plane perpendicular to the top surface 244a together form a continuous arc surface (a curvature of the projection of the top surface 224a of each first movable element 22a on the plane perpendicular to the top surface 224a and a curvature of the projection of the top surface 244a of each second movable element 24a on the plane perpendicular to the top surface 244 are continuously distributed), thereby adapting the flexible device to the shape of the wrist better.

Particularly, when the flexible device is in the first state, the bottom surface of the plate body 340a of the support plate 34a is in contact with a top portion of the top surface 224a of the first movable element 22a and a top portion of the top surface 244a of the second movable element 24a, and is separated from other positions of the top surface 224a of the first movable element 22a adjacent to the top portion of the top surface 224a of the first movable element 22a and other positions of the top surface 244a of the second movable element 24a adjacent to the top portion of the top surface 244a of the second movable element 24a. When in the second state, besides the top portion of the top surface 224a of the first movable element 22a and the top portion of the top surface 244a of the second movable element 24a, the bottom surface of the plate body 340a of the support plate 34a is further in contact with the other positions of the top surface 224a of the first movable element 22a adjacent to the top portion of the top surface 224a of the first movable element 22a and the other positions of the top surface 244a of the second movable element 24a adjacent to the top portion of the top surface 244a of the second movable element 24a. In other words, an area of a portion of the support plate 34a in contact with the top surface 224a of the first movable element 22 or the top surface 244a of the second movable element 24a in the second state is larger than that of a portion of the support plate 34a in contact with the top surface 224a of the first movable element 22 or the top surface 244a of the second movable element 24a in the first state. Certainly, it is to be understood that, actually, the movable elements 300a can fully support the plate body 340a of the support plate 34a, thus it is not necessary to set that the plate body 340a is separably in contact with both the top surface 224a of the first movable element 22a and the top surface 244a of the second movable element 24a, and merely in contact with the top surface 224a of the first movable element 22 or the top surface 244a of the second movable element 24a.

Furthermore, when the flexible device is in the first state, the side surface 222a of the first movable element 22a is spaced apart from the side surface 222a of one opposite and adjacent first movable element 22a by a gap at each side of the flexible device, and the side surface 242a of the second movable element 24a is spaced apart from the side surface 242a of one opposite and adjacent second movable element 24a at each side of the flexible device. When in the second state, the side surface 222a of the first movable element 22a is in contact with the side surface 222a of one opposite and adjacent first movable element 22a at each side of the flexible device, and the side surface 242a of the second movable element 24a is in contact with the side surface 242a of one opposite and adjacent second movable element 24a at each side of the flexible device.

In the foregoing two embodiments, the damping values of the elastic tabs 205a are adjusted to be the same, so that the first movable element 22a and the second movable element 24a at the respective positions move relatively with the same resistance. However, during actual use, the flexible device is usually deformed by pulling the end caps 19a at both ends by both hands. Since the resistance at each position is the same, during transferring an applied external force from the both ends to the middle portion, some positions are skipped, and the applied external force is directly transmitted to the first movable element 22a/second movable element 24a at the next position. As a result, the flexible device cannot be deformed to a shape of a desired circular ring, and the original unfolded state is maintained at some positions. Therefore, the present disclosure further provides an embodiment that reduces or prevents incomplete deformation of the flexible device.

Specifically, in the embodiment, the positioning element 202a of the first movable element 22a is defined as a rotation shaft of the first movable element 22a, and the positioning element 202a of the second movable element 24a is defined as a rotation shaft of the second movable element 24a. By setting damping values of the rotation shafts to be different, the incomplete deformation of the flexible device can be reduced or prevented. As for the first embodiment, the rotation shafts include the first positioning shaft 260 of the first positioning element 26 and the first positioning shaft 280 of the second positioning element 28. As for the second embodiment, the rotation shafts include the first positioning shaft 270a of the first positioning element 26a and the first positioning shaft 270a of the second positioning element 28a. As for the condition that only the first positioning shafts 260 and 280 or the first positioning shafts 270a are included (i.e., the second positioning shafts 262 and 282 are not included, or the second positioning shafts 272a are not included), the rotation shafts include the first positioning shaft 260 of the first positioning shaft 26 and the first positioning shaft 280 of the second positioning element 28a, or include the first positioning shaft 270a of the first positioning shaft 26a and the first positioning shaft 270a of the second positioning shaft 28a.

The damping values of the rotation shafts may gradually increase from a middle to opposite sides, for example, from the second connection element 18a to the end caps 19a. The damping values of the rotation shafts may gradually decrease from the middle to the opposite sides, for example, from the second connection element 18a to the end caps 19a. Therefore, during the deformation of the flexible device, since the damping values gradually change, the external force transferring from the opposite ends to the middle can sequentially deform the first movable elements 22a/second movable elements 24 according to an ascending order of the damping values, thereby avoiding the incomplete deformation.

The damping values can be realized by adjusting the abutting of the elastic tab 502 against the first movable element 22a. By rotating the nut, the elasticity of the elastic tab 502a is changed to abut against the rear side of the first movable element 22a in different degrees.

Certainly, it is to be understood that besides the elastic tab 502, an adjustment of the damping value can be realized in other manners, for example, the positioning elements 202 having different diameters pass through the positioning slots 248a, and the larger the diameter is, the tighter the abutting of the positioning element 202a against the first arc surface and the second arc surface of the positioning slot 248a is, thus the larger the damping value is. For another example, rubber rings with different friction coefficients may be sleeved on portions of the positioning elements 202 in the positioning slots 248a, respectively, and the higher the friction coefficient of the rubber ring is, the greater the damping value is.

Increasing or decreasing the damping values gradually is to enable the flexible device to be successfully deformed to a shape of a circular ring. It is to be understood that, for different application scenarios, the flexible device can be deformed to different shapes to satisfy different usage requirements. For example, the flexible device may be deformed to a shape of an arch bridge, facilitating being placed on a desk to view content displayed on the functional element 30a, or facilitating operating the functional element 30a. Or the flexible device may be deformed to a shape of a ridge, facilitating viewing or operating at front and back. Therefore, to position in various states, the damping values of the rotation shafts may be correspondingly adjusted. Particularly, the damping value of a certain bending position (e.g., a corner position or a sharp corner position) may be set to be lowest, such that the corner position or sharp corner position is firstly deformed during the deformation of the flexible device to form a corner or sharp corner. For a position needed to be in a straight state, the damping value may be set to be highest, such that the position is not deformed during the deformation of the flexible device.

The above-mentioned change of the damping value is appropriate for the two aforementioned embodiments, that is, not only appropriate for the above-mentioned second embodiment, but also appropriate for the above-mentioned first embodiment.

What is claimed is:

1. A flexible device, comprising:
two opposite sides each comprising: a movable element having a top portion; and
a flexible functional element comprising:
a flexible functional screen; and
a support plate supporting the flexible functional screen and comprising a plate body and fixing sheets extending from the plate body, the plate body separably abutting against the top portions of the movable elements, and the fixing sheets fixing to the movable elements.

2. The flexible device of claim 1, wherein each of the fixing sheets is formed by integral bending of the plate body.

3. The flexible device of claim 1, wherein the support plate further comprises connection sheets each connecting one of the fixing sheets to the plate body.

4. The flexible device of claim 3, wherein each of two opposite sides of each of the connection sheets defines a recess recessed toward an inside of the plate body.

5. The flexible device of claim 3, wherein each of the connection sheets is narrower than each of the fixing sheets.

6. The flexible device of claim 1, further comprising fixing elements each passing through one of the fixing sheets and one of the movable elements to fix the one of the fixing sheets to the one of the movable elements.

7. The flexible device of claim 6, wherein each of the fixing elements passes through one of the fixing sheets from outside to inside, and is locked in one of the movable elements.

8. The flexible device of claim 6, further comprising a first connection element connecting to the movable elements.

9. The flexible device of claim 8, wherein the first connection element comprises a base plate supporting the movable elements and sidewalls formed on ends of the base plate, and each of the fixing elements further passes through one of the sidewalls of the first connection element.

10. The flexible device of claim 9, wherein the first connection element further comprises baffles formed on the base plate, each of the baffles is adjacent to one of the sidewalls, and each of the fixing sheets is sandwiched between one of the baffles and one of the sidewalls adjacent to the one of the baffles.

11. The flexible device of claim 10, wherein each of the fixing elements sequentially passes through one of the sidewalls, one of the fixing sheets, and one of the baffles, and is locked in one of the movable elements.

12. The flexible device of claim 9, further comprising another movable elements and a connection beam, each of the another movable elements locates at one of the two opposite sides of the flexible device, and movably connects to one of the movable elements, and the connection beam has opposite ends inserting in the movable elements respectively.

13. The flexible device of claim 12, further comprising a second connection element supporting the another movable elements, and the connection beam locates above the second connection element.

14. The flexible device of claim 13, wherein the base plate of the second connection element is wider than the base plate of the first connection element.

15. The flexible device of claim 1, further comprising positioning elements, each of the two opposite sides of the flexible device further comprising another movable element, each of the movable elements defining at least one positioning slot, each of the another movable elements defining a positioning hole, and each of the positioning elements passing through one of the at least one positioning slot of one of the movable elements and the positioning hole of one of the another movable elements adjacent to the one of the movable elements.

16. The flexible device of claim 15, wherein each of the movable elements defines two positioning slots, each of the positioning slots locates at one of two opposite side portions of each of the movable elements, and each of the fixing elements passes through a portion of one of the movable elements between the two positioning slots of the one of the movable elements.

17. The flexible device of claim 1, further comprising a connection rod having two opposite ends, each of the two opposite sides of the flexible device further comprising another movable element, each of the movable element moves relative to one of the another movable elements, and the two opposite ends of the connection rod inserting in the another movable elements respectively.

18. The flexible device of claim 17, wherein each of the another movable elements has a top portion, the top portion of each of the another movable elements defines a fixing slot, and the connection rod inserts in the fixing slots of the another movable elements.

19. The flexible device of claim 1, wherein each of the two opposite sides of the flexible device further comprises another movable element adjacent to one of the movable elements, each of the another movable elements has a top surface, the top surface of each of the another movable elements has a top portion, each of the movable elements has a top surface, and the top portion of each of the movable elements locates on the top surface of each of the movable elements.

20. The flexible device of claim 19, wherein a movement of each of the movable elements relative to one adjacent another movable element deforms the flexible device to switch between a first state and a second state; in the first state, the plate body of the support plate is separated from other regions of the top surface of each of the another movable elements adjacent to the top portion of each of the another movable elements and other regions of the top surface of each of the movable elements adjacent to the top portion of each of the movable elements; in the second state, the plate body of the support plate is in contact with the other regions of the top surface of each of the another movable elements adjacent to the top portion of each of the another movable elements and the other regions of the top surface of each of the movable elements adjacent to the top portion of each of the movable elements.

* * * * *